(12) United States Patent  
Deever et al.

(10) Patent No.: US 7,978,239 B2
(45) Date of Patent: Jul. 12, 2011

(54) DIGITAL CAMERA USING MULTIPLE IMAGE SENSORS TO PROVIDE IMPROVED TEMPORAL SAMPLING

(75) Inventors: Aaron T. Deever, Pittsford, NY (US); Kenneth A. Parulski, Rochester, NY (US); John R. Fredlund, Rochester, NY (US); Majid Rabbani, Pittsford, NY (US); Andrew F. Kurtz, Macedon, NY (US); Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 444 days.

(21) Appl. No.: 11/680,749

(22) Filed: Mar. 1, 2007

(65) Prior Publication Data

US 2008/0211941 A1     Sep. 4, 2008

(51) Int. Cl.
*H04N 9/09* (2006.01)
*H04N 5/247* (2006.01)

(52) U.S. Cl. ........................ 348/262; 348/264
(58) Field of Classification Search ...... 348/207.99–376
See application file for complete search history.

(56) References Cited

U.S. PATENT DOCUMENTS

| | | | |
|---|---|---|---|
| 3,202,069 A | | 8/1965 | Cummins et al. |
| 4,978,983 A | * | 12/1990 | St.ANG.lfors ................. 396/89 |
| 4,989,078 A | | 1/1991 | Paxton |
| 5,420,635 A | * | 5/1995 | Konishi et al. ............... 348/362 |
| 5,517,242 A | * | 5/1996 | Yamada et al. ............... 348/254 |
| 5,589,880 A | * | 12/1996 | Tsukui ......................... 348/229.1 |
| 6,611,289 B1 | | 8/2003 | Yu et al. |
| 7,009,638 B2 | | 3/2006 | Gruber et al. |
| 2002/0041704 A1 | * | 4/2002 | Yamamoto ................... 382/154 |
| 2002/0149693 A1 | | 10/2002 | Tantalo et al. |
| 2003/0020814 A1 | | 1/2003 | Ono |
| 2003/0202115 A1 | | 10/2003 | Sugimoto et al. |
| 2005/0036055 A1 | * | 2/2005 | Nakasuji et al. ......... 348/333.12 |
| 2005/0046738 A1 | * | 3/2005 | Sato ............................. 348/362 |
| 2005/0057687 A1 | | 3/2005 | Irani et al. |
| 2005/0093982 A1 | | 5/2005 | Kuroki |
| 2005/0231602 A1 | * | 10/2005 | Obrador et al. .......... 348/208.14 |
| 2005/0264679 A1 | * | 12/2005 | Sasaki et al. .................. 348/345 |
| 2005/0275747 A1 | * | 12/2005 | Nayar et al. .................. 348/362 |
| 2006/0139463 A1 | * | 6/2006 | Heinonen ...................... 348/239 |
| 2006/0187312 A1 | * | 8/2006 | Labaziewicz et al. ..... 348/218.1 |
| 2006/0221209 A1 | | 10/2006 | McGuire et al. |
| 2007/0189386 A1 | | 8/2007 | Imagawa |

FOREIGN PATENT DOCUMENTS

| | | |
|---|---|---|
| JP | 09275527 | 10/1997 |
| JP | 11155096 | 6/1999 |
| JP | 2003023555 | 1/2003 |
| JP | 2005086219 | 3/2005 |
| JP | 2005109979 | 4/2005 |
| WO | 2006/137253 | 12/2006 |

* cited by examiner

*Primary Examiner* — Tuan Ho
*Assistant Examiner* — Mark Monk
(74) *Attorney, Agent, or Firm* — Peyton C Watkins

(57) ABSTRACT

A method and apparatus for capturing image data from multiple image sensors and generating an output image sequence are disclosed. The multiple image sensors capture data with one or more different characteristics, such as: staggered exposure periods, different length exposure periods, different frame rates, different spatial resolution, different lens systems, and different focal lengths. The data from multiple image sensors is processed and interleaved to generate an improved output motion sequence relative to an output motion sequence generated from an a single equivalent image sensor.

5 Claims, 19 Drawing Sheets

DIGITAL CAMERA USING MULTIPLE IMAGE SENSORS TO PROVIDE IMPROVED TEMPORAL SAMPLING

FIELD OF THE INVENTION

The present invention relates to a digital camera that captures and stores moving images, and, more particularly, to a digital camera that uses multiple image sensors to capture images of the same scene using different exposure periods.

BACKGROUND OF THE INVENTION

Currently, most digital cameras use a zoom lens and a single color image sensor to capture still and motion images. The captured images are then processed to produce digital image files, which are stored in a digital memory in the camera. The digital image files can then be transferred to a computer, displayed, printed, and shared via the Internet. The motion image sequences captured by these digital cameras are typically compressed, for example by using the well-known MPEG-4 compression standard, and the compressed data is stored using solid-state or magnetic memory.

To provide a motion image sequence having fluid motion, the exposure time of the sensor used to capture the image needs to be sufficiently long (relative to the frame rate) in order to avoid temporal aliasing. If the exposure time is too short, motion artifacts (such as backward-turning wheels on forward-moving cars) may appear in the captured motion image sequence. However, in order to obtain sharp digital images of moving subjects, such as is required to produce a good still image from one of the motion frames, the exposure time must be short enough to freeze the subject. Thus, there are conflicting requirements between minimizing temporal aliasing and providing sharp "freeze frame" images.

To provide a small size digital camera with a large "optical zoom range", the digital camera can use multiple image sensors with different focal length lenses, as described in commonly assigned U.S. Publication No. 2006/0187312 entitled "Digital Camera Using Multiple Lenses and Image Sensors To Provide an Extended Zoom Range". For example, the Kodak Easyshare V610 dual lens digital camera includes a 38-114 mm (35 mm equiv.) f/3.9-f/4.4 lens and a 130-380 mm (35 mm equiv.) f/4.8 lens, in order to provide a 10× optical zoom range. However, in both this above-referenced patent application and product, only one of the two image sensors is used at a time. The two image sensors cannot simultaneously capture motion images.

U.S. Publication No. 2003/0020814 dated Jan. 30, 2003 to Ono discloses a camera having two different lenses which are coupled to two CCD image sensors. In the various embodiments described in this disclosure, the two lenses can provide different focal lengths ranges, or they can be fixed focus lenses set to two different focus distance settings. However, the two image sensors cannot simultaneously capture motion images.

Some video cameras use multiple image sensors to form a color image. In most cameras of this type, a single lens is used to provide an image of the scene, which is then separated into multiple colors by a prism beam splitter. Multiple monochrome image sensors are used to capture red, green, and blue color separation images. However, as disclosed in U.S. Pat. No. 6,611,289, entitled "Digital Cameras Using Multiple Sensors with Multiple Lenses" and issued Aug. 26, 2003 to Yu et al., it is possible to use multiple image sensors and multiple lenses to provide color separation. But in both types of systems, all of the image sensors provide the same temporal sampling, in order to simultaneously capture the different color components of the image.

Some digital imaging systems also use multiple image sensors and multiple lenses to capture different portions of the digital image. Such a system is disclosed in U.S. Pat. No. 7,009,638 issued Mar. 7, 2006 to Gruber et al. In one embodiment disclosed in this patent, a large format digital camera exposes multiple detector arrays using multiple lens systems to acquire sub-images of overlapping sub-areas of large area objects. The sub-images are stitched together to form a large format digital macro-image. Again, all of the image sensors provide the same temporal sampling to simultaneously capture the different sub-areas of the image.

Stereo film cameras and stereo electronic cameras are known in the prior art. These cameras typically have two horizontally separated lenses of the same focal length, which focus two slightly different images of the scene onto two image sensors or two frames of film. Such a system is disclosed in commonly assigned U.S. Pat. No. 4,989,078, entitled "Still Video Camera for Recording Stereo Images on a Video Disk" and issued on Jan. 21, 1991 to K. Bradley Paxton. The two images provide a so-called "stereo pair", which simulates the slightly different perspectives that a person's left and right eyes would see when viewing the scene. Again, both of the image sensors provide the same temporal sampling to simultaneously capture the stereo image pair.

Film cameras that use multiple lenses to capture multiple images at approximately the same time are also known in the prior art. For example, some cameras provide a shutter delay to expose different parts of the film at different times. Such a system is disclosed in commonly assigned U.S. Pat. No. 3,202,069, entitled "Sequence Camera" and issued on Aug. 24, 1965 to James B. Cummings and Theodore R. Kolter. A plurality of sequential still photographs is taken, each exposing a predetermined area of the film. The camera, however, is unable to simultaneously capture motion images.

None of these prior art systems address the conflicting requirements between minimizing temporal aliasing and providing sharp "freeze frame" images.

What is therefore needed is a digital camera that uses multiple image sensors to capture images of the same scene using different exposure periods.

SUMMARY OF THE INVENTION

In general terms the present invention provides a digital camera that uses multiple image sensors to simultaneously capture images of the same scene using different exposure periods.

One aspect of this invention is to provide an electronic camera for producing a sequence of output image frames of a scene. The electronic camera includes a first image sensor for generating a first sensor output, a second image sensor for generating a second sensor output, one or more lenses for forming images of a scene on the first and second image sensors, a timing generator for controlling the exposure period of the first image sensor and the exposure period of the second image sensor, wherein the exposure period of the first image sensor is longer than the exposure period of the second image sensor, and a digital memory for substantially simultaneously storing image sequences of the first sensor output and the second sensor output.

Another aspect of this invention is to provide an electronic camera for producing a sequence of output image frames of a scene at a frame rate of up to N frames per second. The electronic camera includes a plurality of M image sensors for generating M sensor outputs, wherein the frame rate of each of the M image sensors is equal to N/M, one or more lenses for forming images of the scene on said plurality of M image sensors, and a timing generator for controlling the starting time of the exposure period of each of the plurality of M image sensors such that the difference in the starting times between any two of the plurality of M image sensors is approximately equal to an integer multiple of 1/N seconds.

In another aspect of this invention is to provide an electronic camera for producing a sequence of output image frames of a scene. The electronic camera including a first image sensor for generating a first sensor output, a second image sensor for generating a second sensor output, one or more lenses for forming images of the scene on the first and second image sensors, a frame rate control for selecting high and low frame rate options, and a timing generator for controlling the exposure period of the first image sensor and the exposure period of the second image sensor, wherein the exposure period of the first image sensor is longer than the exposure period of the second image sensor when high frame rate is not selected, and the exposure period of the first image sensor is approximately equal to the exposure period of the second image sensor when high frame rate is selected.

In another aspect of the invention, an electronic camera produces a sequence of output image frames of a scene at a frame rate of N frames per second. The electronic camera includes a first image sensor for generating a high spatial resolution first sensor output at a rate of N/K frames per second, where K is an integer greater than 1, a second image sensor for generating a low spatial resolution second sensor output at a rate of N frames per second, and one or more lenses for forming images of the scene on the first and second image sensors.

In another aspect of the invention, an electronic camera produces a sequence of output image frames of a scene, said electronic camera includes a first image sensor for generating a first sensor output, a second image sensor for generating a second sensor output, one or more lenses for forming images of the scene on the first and second image sensors, a low noise control for selecting a low noise option, and a timing generator for controlling the exposure period of the first image sensor and the exposure period of the second image sensor, wherein the exposure period of the first image sensor is extended when the low noise control is activated.

In another aspect of the invention, a method for producing a sequence of output image frames of a scene is disclosed. The method includes generating a first sensor output from a first image sensor, generating a second sensor output from a second image sensor, forming images of a scene on the first and second image sensors using one or more lenses, controlling the exposure period of the first image sensor and the exposure period of the second image sensor, wherein the exposure period of the first image sensor is longer than the exposure period of the second image sensor, and substantially simultaneously storing image sequences of the first sensor output and the second sensor output in a digital memory.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
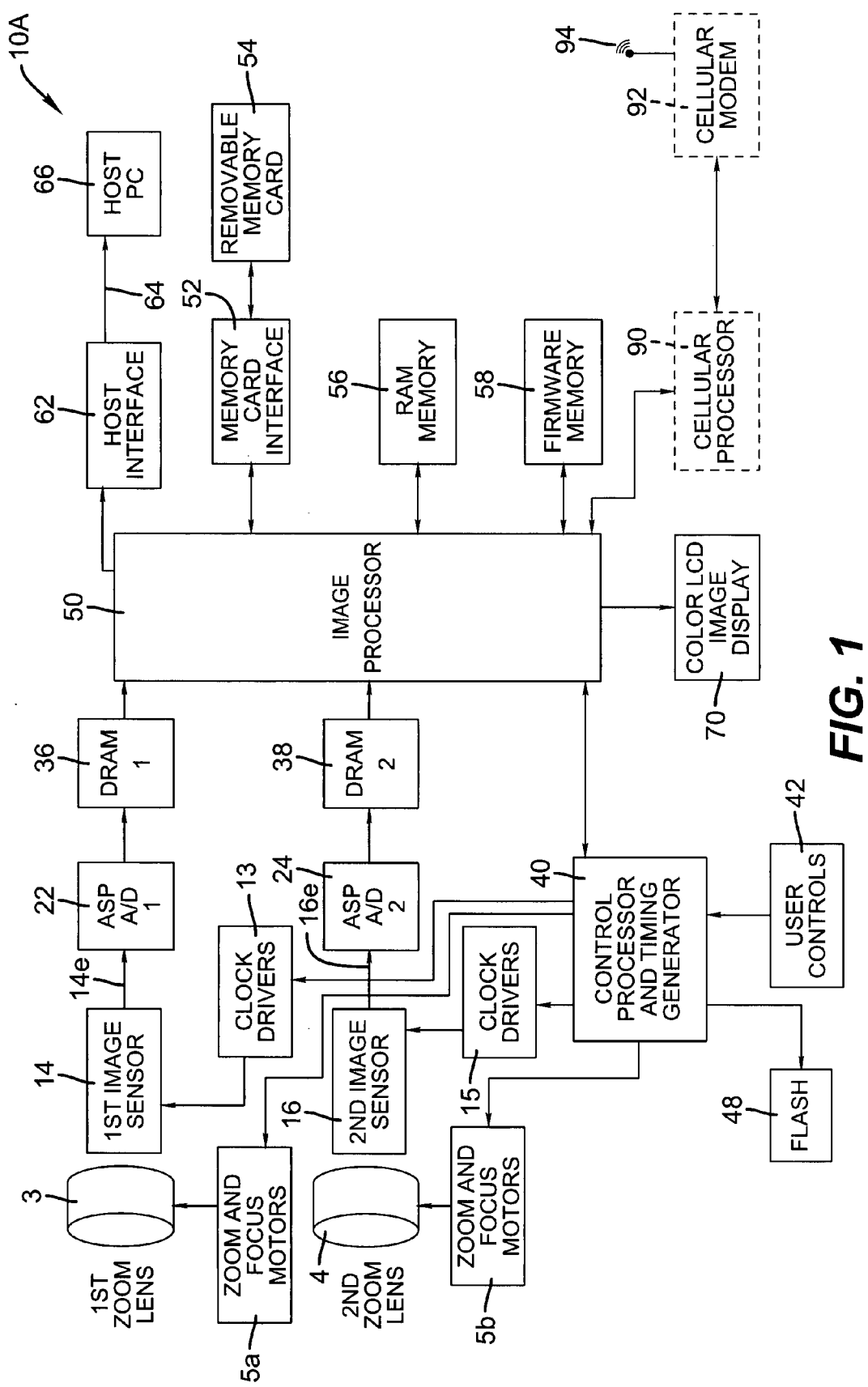
FIG. 1 depicts a block diagram of a first example of a digital camera using a first zoom lens with a first image sensor, and a second zoom lens with a second image sensor according to the invention.

FIG. 1 depicts a block diagram of a first embodiment of a digital camera 10A according to the present invention. Digital camera 10A is a portable battery operated device, small enough to be easily handheld by a user when capturing and reviewing images. The digital camera 10A preferably produces both still digital images and motion digital image sequences (e.g. video clips) that are stored on a removable memory card 54. Alternatively, the digital camera may produce and store only motion digital image sequences.

The digital camera 10A includes two zoom lenses, each providing an image to a corresponding image sensor. The first zoom lens 3 is controlled by zoom and focus motors 5a, and provides an image to the first image sensor 14. The second zoom lens 4 is controlled by zoom and focus motors 5b, and provides an image to the second image sensor 16. However, the embodiment is not limited to a zoom lens and any suitable lens can be used. An adjustable aperture in each lens (not shown) is used to control the exposure of the image sensors 14 and 16. However, the embodiment is not limited to an adjustable aperture and any suitable device for controlling exposure can be used. For example, an electronic exposure time control can be provided to the image sensors 14, 16 by the control processor and timing generator 40. Accordingly, in one embodiment, the apertures and exposure times of the two lenses 3, 4 can be set to different values while providing the same exposure setting. For example, the f/number of the first zoom lens 3 could be set to a large value (e.g. f/16) while the exposure time of the first image sensor 14 is set to a relatively long exposure period (e.g. 1/30 second). Similarly, the f/number of the second zoom lens 4 could be set to a smaller value (e.g. f/8) while the exposure time of the second image sensor 16 is set to a to relatively short exposure period (e.g. 1/120 second). A control processor and timing generator 40 controls the first image sensor 14 by supplying signals to clock drivers 13, and controls the second image sensor 16 by supplying signals to clock drivers 15.

The control processor and timing generator 40 also controls the zoom and focus motors 5a and 5b, and a flash 48 for emitting light to illuminate the scene. User controls 42 are used to control the operation of the digital camera 10A, as will be described in FIG. 2B.

The analog output signal 14e from the first image sensor 14 is amplified and converted to a first digital image signal by a first analog signal processor and A/D converter (ASP & A/D 1) 22 and provided to a first DRAM buffer memory 36. The analog output signal 16e from the second image sensor 16 is amplified and converted to a second digital image signal by a second analog signal processor and A/D converter (ASP & A/D) 24 and provided to a second DRAM buffer memory 38. The image data stored in the DRAM buffer memories 36, 38 is processed by an image processor 50 to produce a processed digital image file, which may contain a motion digital image sequence or a still digital image.

The processing performed by the image processor 50 is controlled by firmware stored in a firmware memory 58, which can be flash EPROM memory. The processor 50 processes the digital input image from the DRAM buffer memory 38, using the RAM memory 56 to store intermediate results.

It should be noted that the image processor 50, while typically a programmable image processor, can alternatively be a hard-wired custom integrated circuit (IC) processor, a general purpose microprocessor, or a combination of hard-wired custom IC and programmable processors. Furthermore, one or more of the functions shown as separate blocks in FIG. 1, such as the DRAM buffer memories 36, 38, and the RAM memory 56, can be incorporated in an IC containing the image processor 50.

The processed digital image file is provided to a memory card interface 52, which stores the digital image file on the removable memory card 54. Removable memory card 54 is one type of removable digital image storage medium, and is available in several different physical formats. For example, the removable memory card 54 can include, but is not limited to, memory cards adapted to well-known formats, such as the Compact Flash, SmartMedia, MemoryStick, MMC, SD, or XD memory card formats. Other types of removable digital image storage media, such as magnetic hard drives, magnetic tape, or optical disks, can alternatively be used to store the still and motion digital images. Alternatively, the digital camera 10A can use internal non-volatile memory (not shown), such as internal Flash EPROM memory to store the processed digital image files. In such an example, the memory card interface 52 and the removable memory card 54 are not needed.

The image processor 50 performs various image processing functions, including color interpolation followed by color and tone correction, in order to produce rendered color image data. If the camera is in still image mode, the rendered color image data is then JPEG compressed and stored as a JPEG image file on the removable memory card 54. The rendered color image data may also be provided to a host PC 66 via a host interface 62 communicating over a suitable interconnection 64, such as a WiFi connection, a USB connection or a Firewire connection. In one embodiment, the JPEG file uses the so-called "Exif" image format defined in the well-known "Digital Still Camera Image File Format (Exif)" format. This format includes an Exif application segment that stores particular image metadata, including the date/time the image was captured, as well as the lens f/number and other camera settings.

If the camera is in motion image mode, the rendered color image data is compressed using MPEG-4 compression and stored on the removable memory card 54 using, but not limited to, the well-known QuickTime format developed by Apple Computer Inc. It is understood that other motion image formats can be employed using other known compression technologies such as MPEG-1, MPEG-2, H.263, H.264, and the like. In motion image mode, the rendered color image data may also be provided to a host PC 66 via a host interface 62 communicating over a suitable interconnection 64.

The image processor 50 also creates a low-resolution "thumbnail" size image of the still image, or of a suitable frame of the motion image. This thumbnail size image can be created as described in commonly-assigned U.S. Pat. No. 5,164,831, entitled "Electronic Still Camera Providing Multi-Format Storage Of Full And Reduced Resolution Images" issued to Kuchta, et al., the disclosure of which is herein incorporated by reference. After still and motion images are captured, they can be quickly reviewed on a color LCD image display 70 by using the thumbnail images to select desired still images or motion image sequences. The graphical user interface displayed on the color LCD image display 70 is controlled by the user controls 42.

In some examples of the present invention, the digital camera 10A is included as part of a camera phone. In such examples, the image processor 50 also interfaces to a cellular processor 90, which uses a cellular modem 92 to transmit and receive digital images to a cellular network (not shown) using radio frequency transmissions via an antenna 94.

Figure 2A:
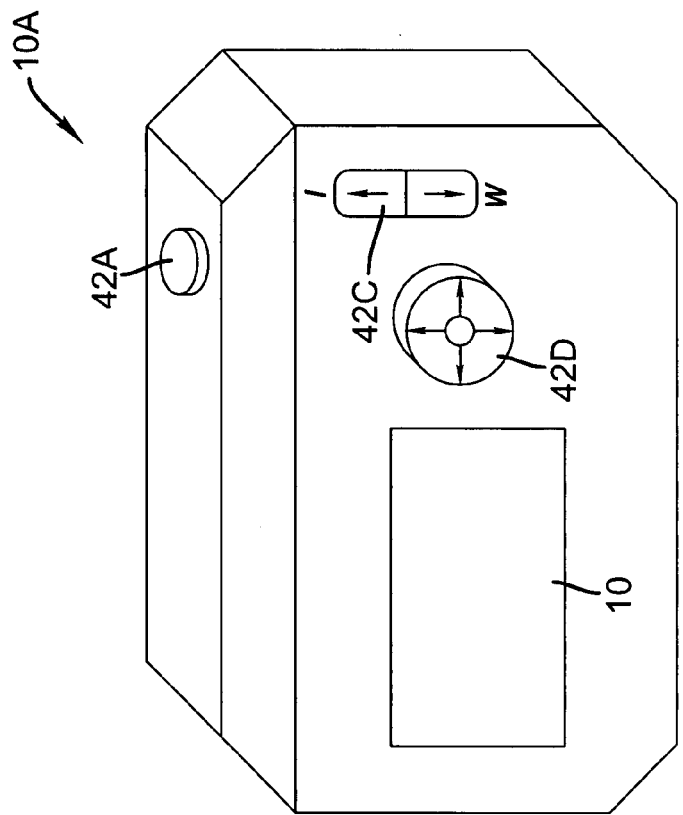
FIGS. 2A and 2B are two perspective views of the digital camera shown in FIG. 1.
Figure 2B:
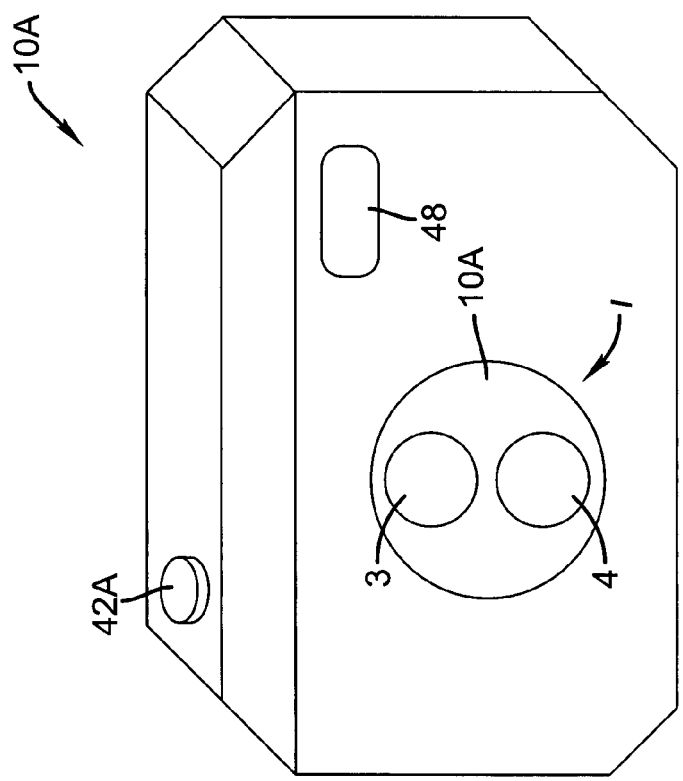

FIGS. 2A and 2B show perspective views of the digital camera 10A described in relation to FIG. 1. FIG. 2A is a frontal view of the camera 10A, showing a front optical profile 1 having the first zoom lens 3, the second zoom lens 4, and the flash 48. FIG. 2B is a rear view of the camera showing the color LCD image display and a number of user controls, including a shutter button 42a for enabling an image capture sequence, a zoom button 42c for enabling a selection of a zoom setting, and a multi-position selector 42b for navigating through images, menu choices and the like that are displayed on the color LCD image display 70. These menu choices include selecting between a still image and a motion image mode.

In one embodiment, the images sensors 14 and 16 are identical in size, both as to aspect ratio and pixel size, and the first zoom lens 3 and the second zoom lens 4 are also identical. The zoom lenses 3 and 4 can be, but are not limited to, 38-114 mm (35 mm equiv.) f/3.9-f/4.4 lens. For example, 38 mm is the focal length of a 35 mm photographic film camera that provides the same field of view as the zoom lens 3 provides to the image sensor 14 when set to its shortest focal length position, as defined in the ANSI/I3A IT10.7000-2004 standard available from the American National Standards Institute, Inc., New York, N.Y. The second zoom lens 4 has a 130-380 mm (35 mm equiv.) f/4.8 focal length range.

The 35 mm film equivalent focal length (f.1) can be calculated using the formula:

$$35 \text{ mm-equiv.} f.1 = (\text{actual lens } f1. \text{ (mm)} \times 43.27 \text{ mm}) / \text{diagonal sensor focal plane distance (mm)} \quad (1)$$

For example, if the image sensor uses a one-half inch type optical format, it has a focal plane of 6.4 mm (width)×4.8 mm (height), with a diagonal distance of 8.0 mm. If this type of image sensor is used with a lens having an actual focal length of 8.0 mm, the 35 mm equiv. focal length is 44 mm ((8 mm×43.27 mm)/8 mm).

In another embodiment, the first and second zoom lenses can have different focal lengths. For example, the first zoom lens 3 can be a 38-176 mm (35 mm equiv.) f/3.9-f/4.4 lens, and the second zoom lens 4 can be a 114-228 mm f/4.8 focal length lens. In this example, the first lens 3 and second lens 4 provide an overlapping zoom range for 114 mm to 176 mm.

In some embodiments, the image sensors 14 and 16 are single-chip color Megapixel CCD sensors, using the well-known Bayer color filter pattern to capture color images. The image sensors 14 and 16 can have, for example, a 4:3 image aspect ratio and a total of 6.1 MP effective megapixels (million pixels), with 2848 active columns of pixels×2144 active rows of pixels.

Figure 3:
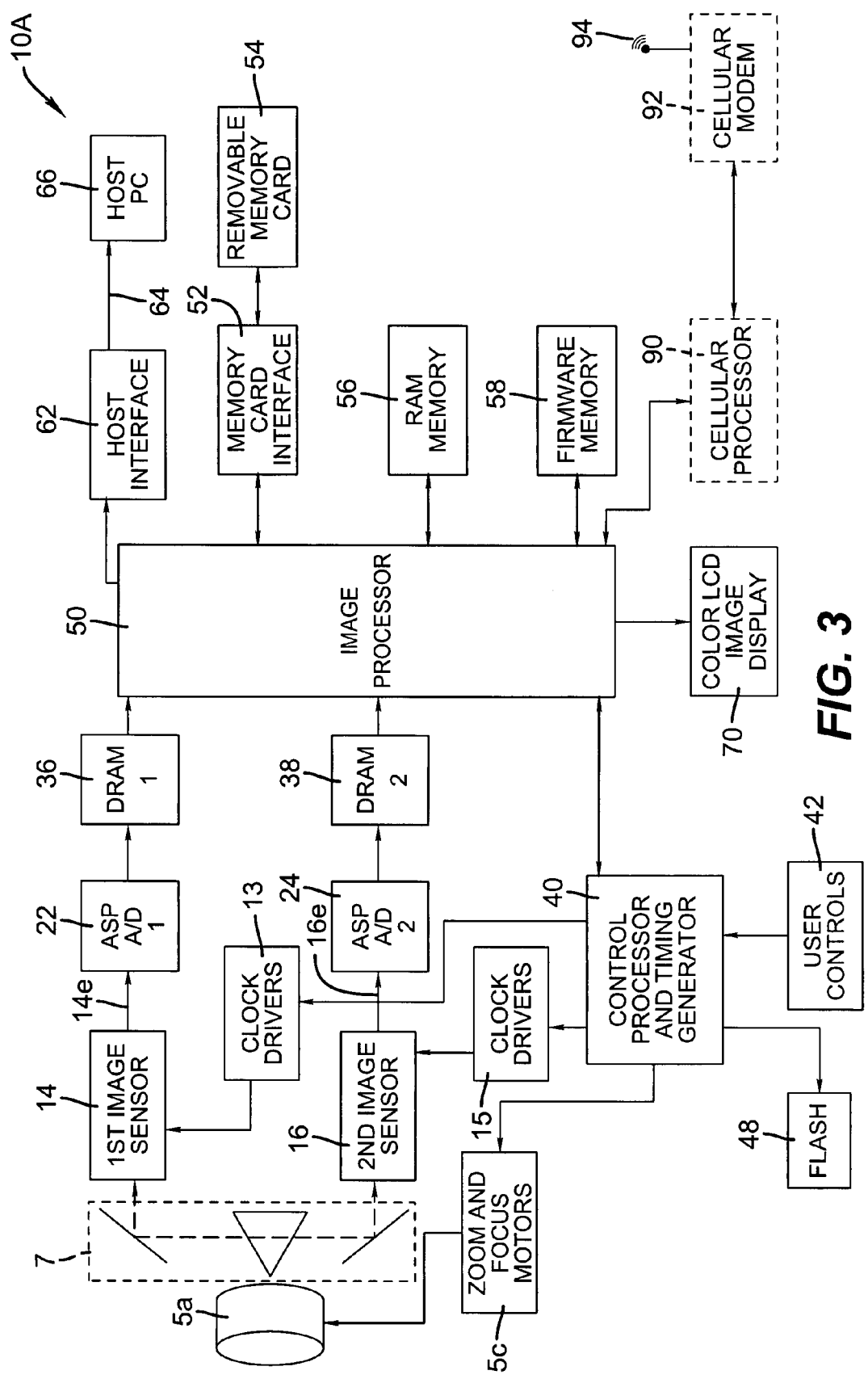
FIG. 3 depicts a block diagram of a second example of a digital camera using a single zoom lens with a first image sensor and a second image sensor according to the invention.

FIG. 3 depicts a block diagram of a second embodiment of a digital camera using a single zoom lens with a first image sensor and a second image sensor according to the invention. In the second embodiment, a digital camera 10B includes a single zoom lens 5c, controlled by zoom and focus motors 5c. A beam splitter 7 separates the image from the lens 5c into two images that are focused on the first image sensor 14 and the second image sensor 16. This eliminates the optical parallax problems that occur when two separate lenses are used as in FIG. 1.

The remaining aspects of the digital camera 10B are similar to the digital camera 10A shown in FIG. 1, and retain the same reference characters. Reference is therefore made to FIG. 1 for further description of these aspects of the digital camera 10B.

FIGS. 4A-4F depict timing diagrams showing different exposure timing options to provide improved temporal sampling when a digital camera is in motion image mode. In one embodiment of FIG. 4A, a first image sensor captures a first motion image sequence at a rate of N frames per second with an associated exposure time #1 100A. A second image sensor substantially simultaneously captures a second motion image sequence at the same rate of N frames per second with an associated exposure time #2 102A. More specifically, in the example shown in FIG. 4A, exposure time #2 102A has a shorter exposure duration than exposure time #1 100A, and exposure time #2 102A occurs during a portion of exposure time #1 100A. Accordingly, the exposure time #1 100A associated with the images captured with the first sensor is substantially longer than the exposure time #2 102A associated with the images captured with the second sensor. However, the embodiment is not limited to the exposure time #1 100A being substantially longer than the exposure time #2 102A and, in an alternate embodiment, exposure time #1 100A can be of some other duration, such as a duration shorter than exposure time #2 102A. In yet another embodiment, the exposure time #2 102A, having a shorter duration than exposure time #1, can begin before the exposure time #1 100A or end after exposure time #1 100A. In all of these embodiments, the exposure time #1 100A and the exposure time #2 102A occur substantially simultaneously, since both image sensors capture a motion image frame of the scene at approximately the same time, although they use different exposure durations.

Figure 4A:
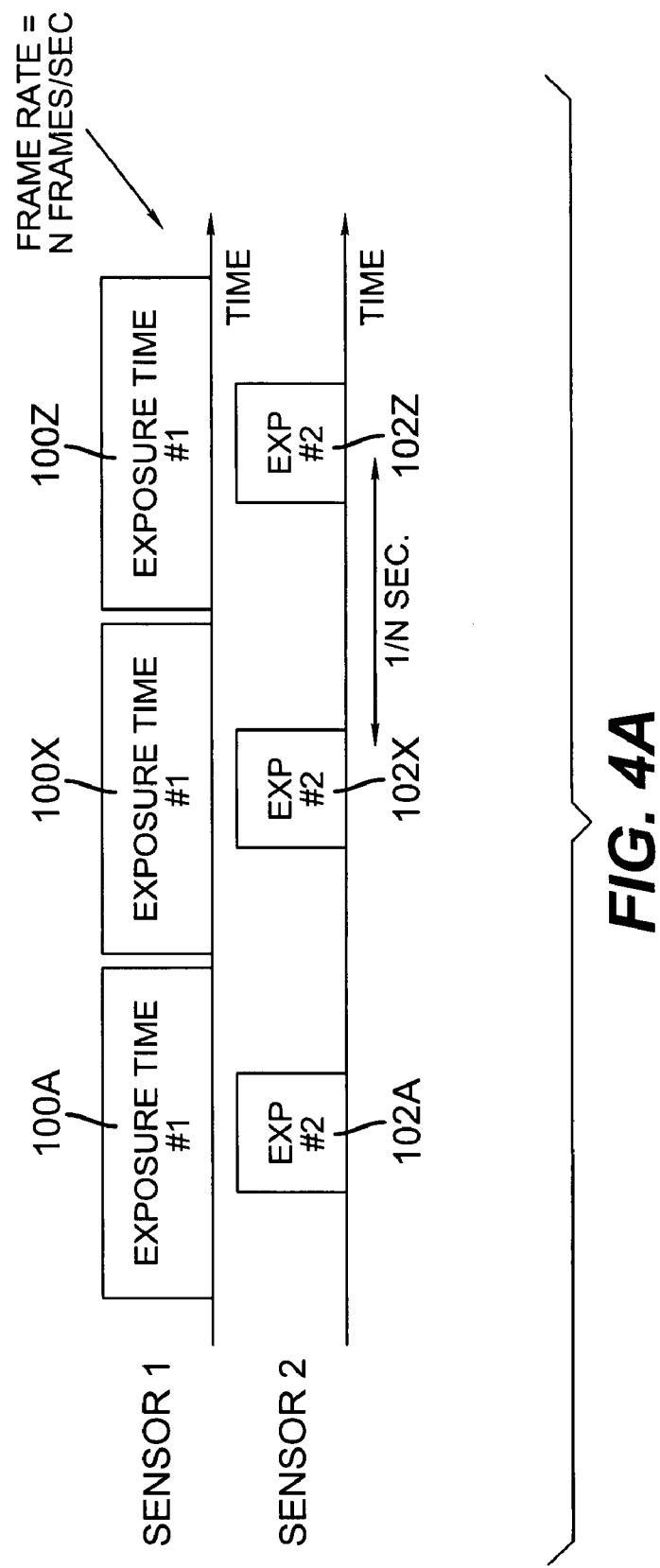
FIGS. 4A-F are timing diagrams showing exposure timing options to provide improved temporal sampling.

Thus, the first sensor captures images with smoother motion and less noise than the second sensor. Conversely, the second sensor captures sharper "freeze frame" images than the first sensor. In one embodiment, both image sequences are recorded substantially simultaneously on the removable memory card 54, so that either image sequence can be played back. That is, image sequences provided using the output of the first image and second images sensors, having exposure times #1 and exposure times #2 respectively, as illustrated in FIG. 4A, can be recorded to memory card 54 by interleaving or alternating between recording frames of the first and second image sequences in the following order: exposure time #1 100A for first image sequence, exposure time #2 102A for the second image sequence, exposure time #1 100X for the first image sequence, exposure time #2 102X for the second image sequence, exposure time #1 100Z for the first image sequence, and exposure time #2 102Z for the second image sequence.

In yet another embodiment, using either the output of the first image sensor 14 or the output of the second image sensor 16 forms a new image sequence. This new image sequence depends on the amount of motion currently occurring in the scene.

Figure 4B:
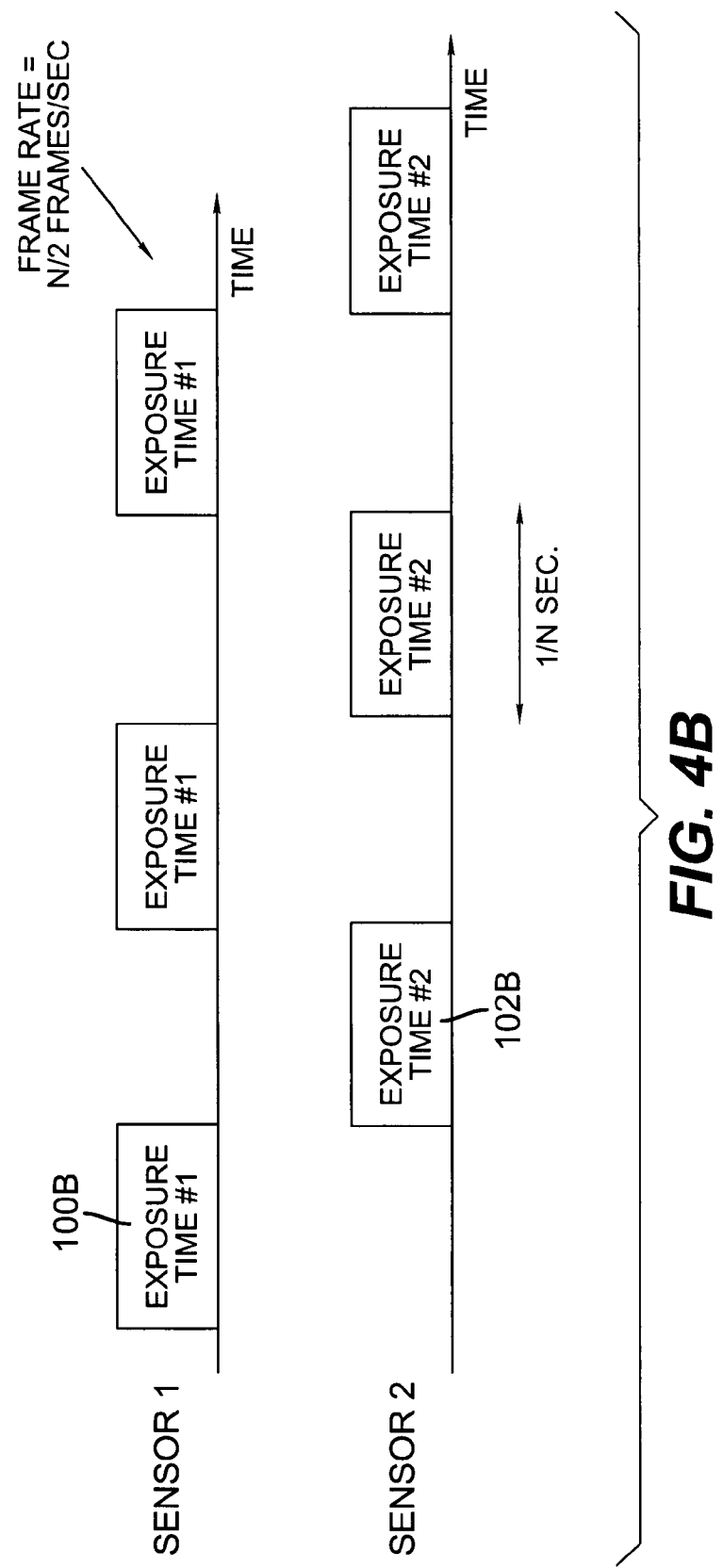

FIG. 4B depicts a timing diagram in which a first image sensor captures motion images at a rate of N/2 frames per second, with an associated exposure time 100B of 1/N seconds. A second image sensor also captures motion images at the same rate of N/2 frames per second, with an associated exposure time 102B of 1/N seconds, wherein the exposure periods of the first and second sensors are staggered such that they do not overlap although the exposure durations 100B and 102B are the same (e.g. 1/60 sec.). In other words, the frame rates for each of the sensors are the same, but the start of the exposure periods from the second sensor is out-of-phase. In one embodiment, the exposure durations of the first and second sensors are substantially the same, and the phase difference between the start of the exposure periods is 180 degrees. The motion images from the two sensors can be interleaved to form a sequence with an overall capture rate of N frames per second. This motion capture embodiment allows the formation of an interleaved output stream with higher frame rate than required of either individual sensor.

Figure 4C:
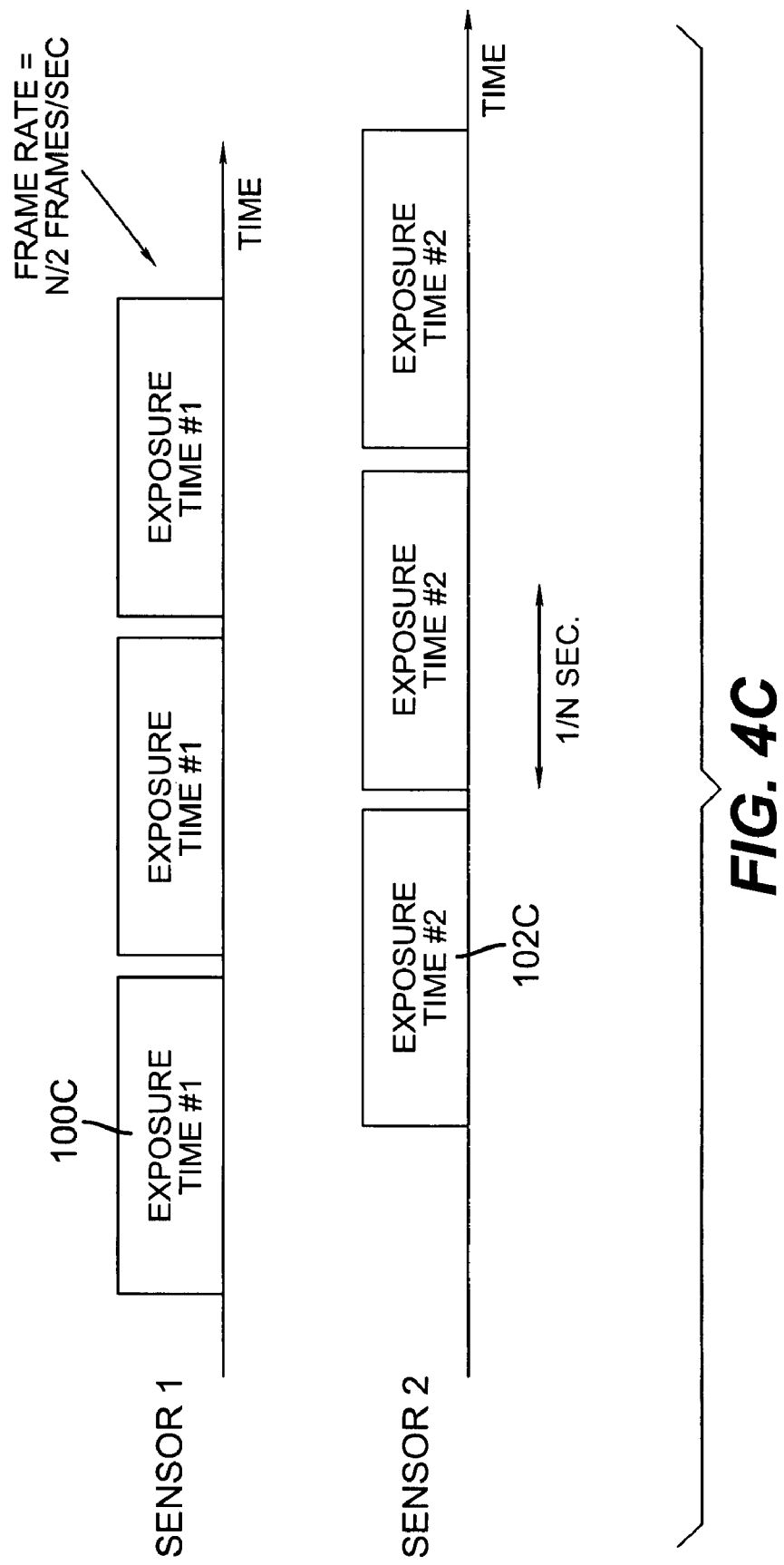

FIG. 4C depicts a timing diagram in which a first image sensor captures motion images at a rate of N/2 frames per second, with an associated exposure time 100C of nearly 2/N seconds. A second image sensor also captures motion images at a rate of N/2 frames per second, with an associated exposure time 102C of nearly 2/N seconds, wherein the exposure periods of the first and second sensors are staggered and overlap in a manner such that a given exposure period for the first image sensor approximately evenly overlaps two consecutive exposure periods of the second image sensor. Likewise, a given exposure period for the second image sensor is the same duration as the exposure period for the first image sensor and approximately evenly overlaps two consecutive exposure periods of the first image sensor. The motion images from the two sensors can be interleaved to form a sequence with an overall capture rate of N frames per second. This motion capture embodiment allows the formation of an interleaved output stream with higher frame rate than required of either individual sensor. The timing diagram depicted in FIG. 4C results in a motion sequence with less noise relative to a corresponding motion sequence generated according to the timing diagram depicted in FIG. 4B, because the exposure period is longer than the frame period 1/N.

Figure 4D:
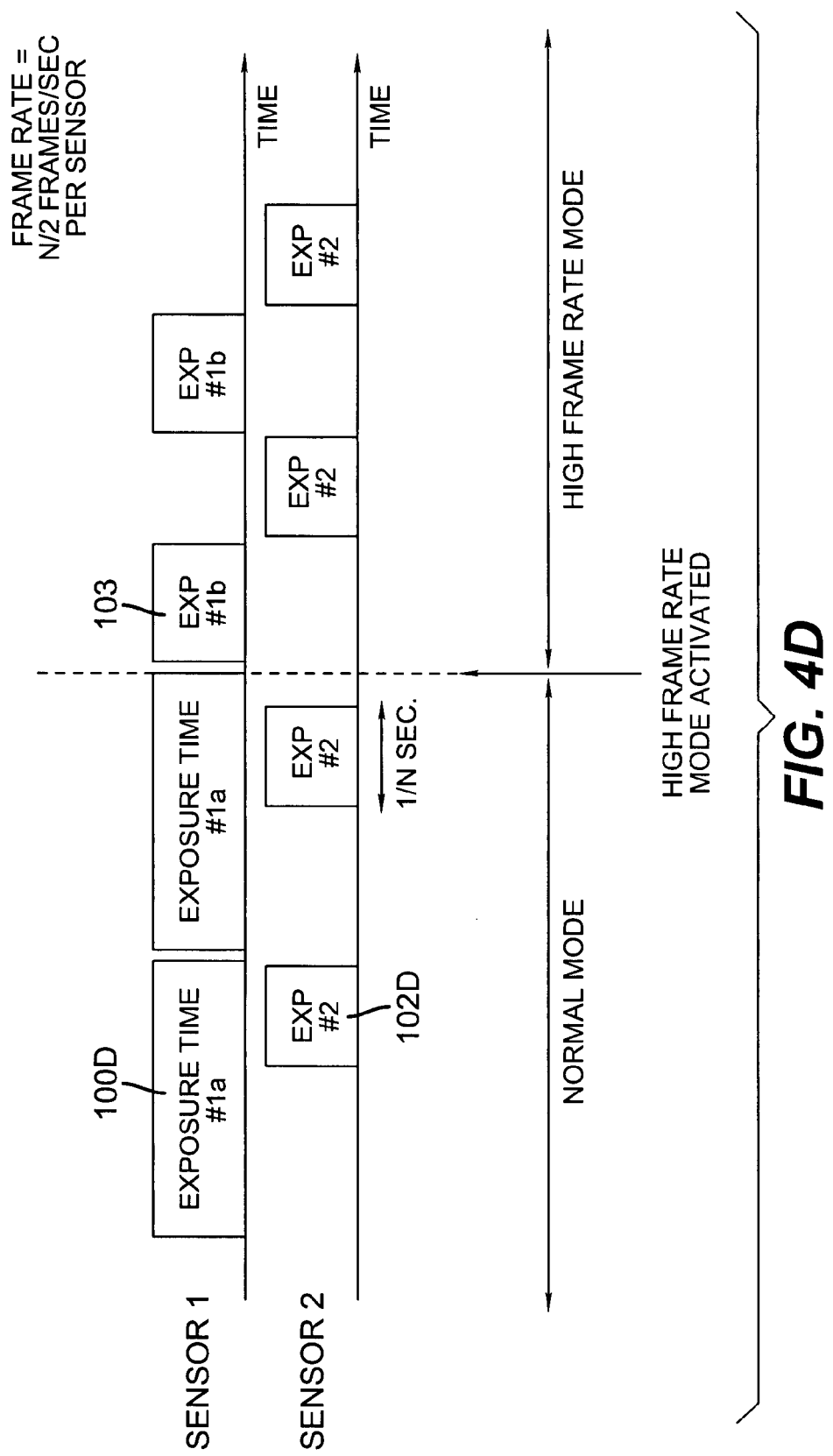

FIG. 4D illustrates a timing diagram having multiple exposure modes. Accordingly, FIG. 4D depicts a normal mode timing diagram in which initially a first sensor captures motion images using a longer exposure time 100D than a second sensor with an associated exposure time 102D, similar to the timing diagram depicted in FIG. 4A. In response to an event, whether user-triggered or automatically detected, a high frame rate mode is illustrated in which the first sensor reduces its exposure time 103 to equal the exposure time 102D of the second sensor. The exposure periods of the first and second image sensors are staggered as in FIG. 4B in order to provide double the number of image frames per second.

Figure 4E:
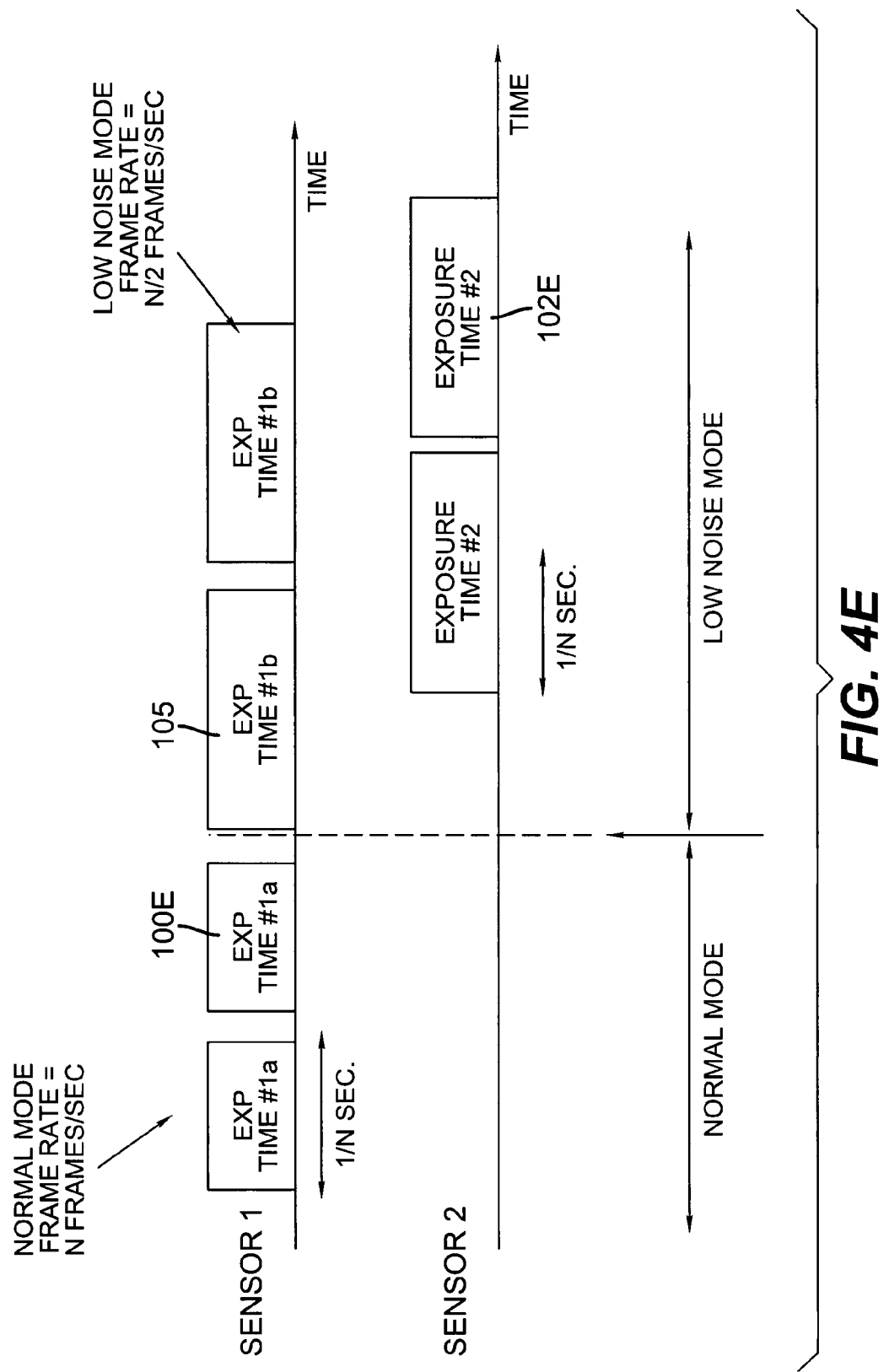

FIG. 4E depicts a timing diagram in which initially a first sensor captures motion images at a rate of N frames per second using an exposure time 100E. In response to an event, whether user-triggered or automatically detected, the first sensor reduces its capture rate to N/2 frames per second with an exposure duration of approximately 2/N seconds per frame 105, and a second sensor also captures frames at a rate of N/2 frames per second with an exposure duration of approximately 2/N seconds per frame 102E. The exposure periods of the first and second sensor are staggered and overlap as in FIG. 4C.

Figure 4F:
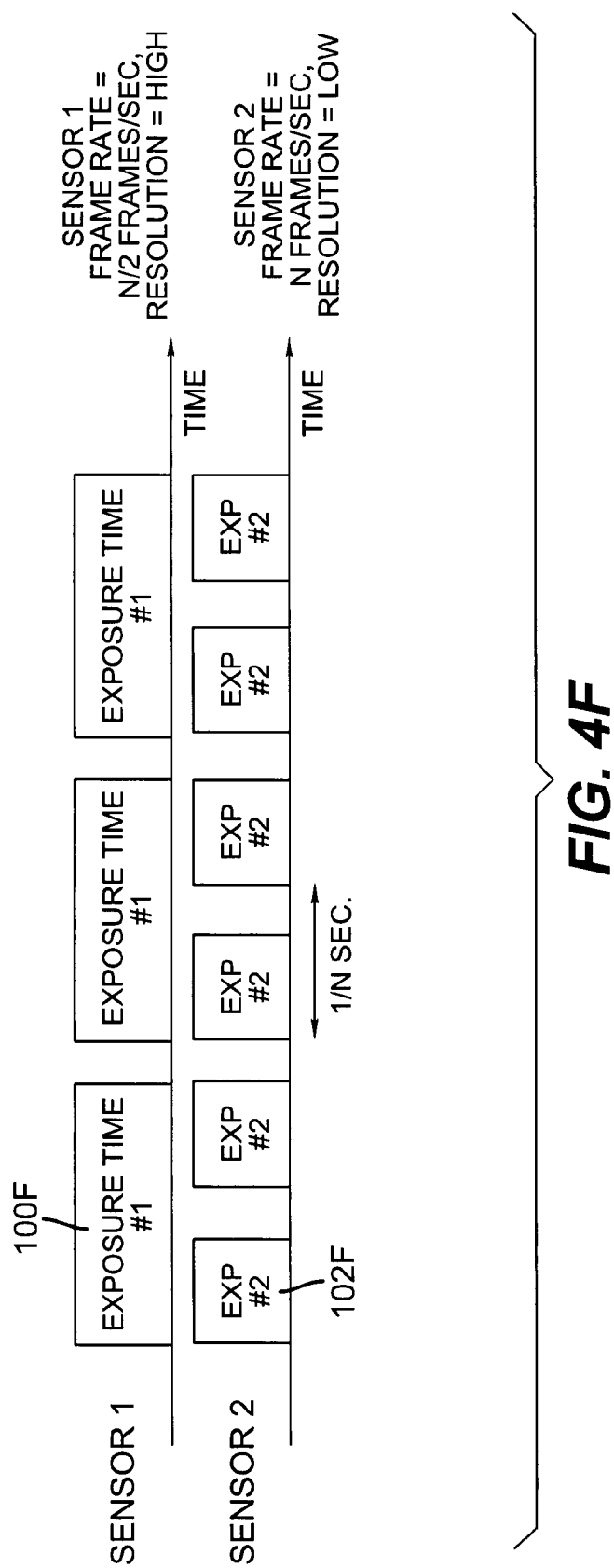

FIG. 4F depicts a timing diagram in which a first sensor captures high resolution motion images at a rate of N/2 frames per second, while a second image sensor captures low resolution motion images at a rate of N frames per second. The exposure time 100F associated with the images captured with the first sensor is substantially longer than the exposure time 102F associated with the images captured with the second sensor.

Figure 5A:
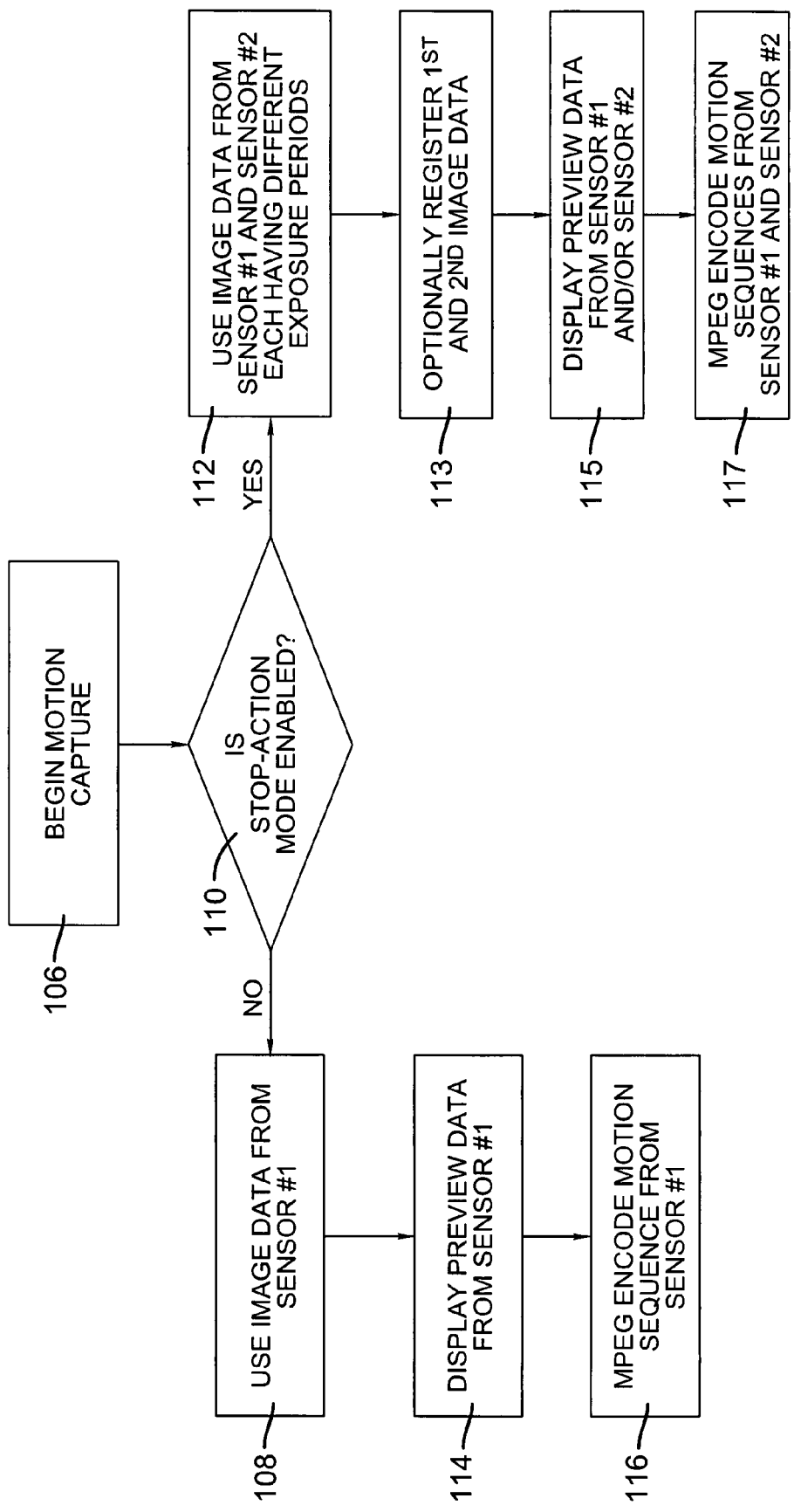
FIGS. 5A-B depict flow diagrams showing methods for capturing digital image sequences with improved stop-action performance using the digital camera shown in FIG. 1 or FIG. 3 and the timing diagram shown in FIG. 4A.

FIG. 5A depicts a flow diagram showing one embodiment for capturing digital image sequences using the digital cameras shown in FIG. 1 and FIG. 3, and corresponding to the timing diagram shown in FIG. 4A. In FIG. 5A, when a motion capture is initiated in block 106, the user has the option to initiate a "stop action" mode in block 110. In some embodiments, the "stop action" mode is initiated when the user presses a dedicated physical button on the camera. In alternative embodiments, the stop-action mode can be selected from a menu of modes displayed on the color LCD image display 70 using the multi-position selector 42b. In other alternative embodiments, the shutter button 42a can be partially depressed to initiate the stop-action mode.

When the stop-action option is not selected ("no" from block 110), only the image data from the first image sensor 14 is selected for processing by the image processor 50 in block 108. The processing includes providing a preview image on the color LCD image display in block 114. The processing also includes providing an MPEG encoded motion sequence in block 116.

If the stop-action option is selected ("yes" to block 110), in block 112 images are captured using both the first image sensor 14 and the second image sensor 16, but using different exposure durations, as shown in FIG. 4A. The image sequences from both sensors are processed by the image processor 50. The processing optionally includes registering the first and second image data in block 113, as will be described later. Preview image data is displayed on the color LCD image display in block 115. This preview image data can be provided using the output from both sensors, or using the output from only the first image sensor 14.

In block 117, MPEG encoded motion sequences from both the first image sensor 14 and the second image sensor 16 are produced by the image processor 50 and stored on the removable memory card 54. In one embodiment, this is done by recording two separate MPEG encoded files. In another embodiment, the first MPEG encoded file can be an MPEG encoded file provided by the output of the first image sensor 14, and the file can be augmented with additional information that encodes the difference between the output of the first and second image sensors. This latter approach reduces the amount of data that must be recorded, since there is significant redundancy between the two motion sequences, which differ primarily because the shorter exposure time used for the second sequence yields less motion blur. Metadata can be written in the file to indicate that the "stop action" mode was enabled when recording this particular motion sequence.

As mentioned above, in some embodiments an optional sensor data registration block 113 can be used in the processing of the image data coming from the first and second image sensors. In particular, this processing can be used to correct for a misregistration image artifact that can occur when interlacing image data captured by two spatially offset optical lenses (as in FIG. 1). In a multi-lens camera of the type of FIG. 1, with two adjacent lenses 3 and 4, the two optical systems are capturing two slightly different image fields, even if they are imaging fields of view of the same size. That is, the captured images from the two sensors are slightly offset, or misaligned or misregistered relative to each other. When the two image data streams are interlaced to form a motion image sequence, the transitions caused by switching the playback motion sequence from one sensor output to the other, without any registration correction, may result in a jerking movement in the assembled motion image sequence. When capturing images of a distant object, this misalignment due to parallax may be small and not noticeable. When capturing near objects, however, the misalignment may be noticeable and distracting. Additionally, compressing the difference between the image data from the two sensors will be less efficient.

Corrections can be enabled by the optional sensor data registration block 113. In some cases, the two lenses 3 and 4 have identical focal lengths, the first image sensor is chosen as the reference sensor, and both image sensors provide a larger area of image data than is retained for the final motion image sequence resolution. In this case, a centralized window of data of appropriate size is always chosen from the first image sensor when it is selected. When the stop-action mode is enabled such that data from the second image sensor is selected, the second image sensor data is aligned with the first image sensor data to determine a relative offset, and an appropriate window of data from the second image sensor is chosen to match the central data region of the first image sensor. Basically, sensor data registration block 113 provides image shift and cropping functions, where the two image sets are shifted into alignment, and then cropped to matching sizes.

As described earlier in FIG. 1, it is possible that the two lenses have different focal length ranges as well as spatial offsets. In this case, it may also be necessary to adjust the spatial sampling of one or both of the image sensors in order to allow a seamless transition between the two, or to enable the "stop action" mode only for focal lengths that can be provided by both the first zoom lens 3 and the second zoom lens 4 (e.g., the 114 mm-176 mm range described earlier).

The multi-lens camera geometry (see FIGS. 1 and 2A), with imaging by two or more adjacent optical systems, can also cause angular perception artifacts, as well as positional shift artifacts. This again is particularly true when the object(s) being imaged are relatively near to the camera. A variety of image effects, including parallax effects and differences in shadowing or viewpoint, which in turn may tend towards stereoscopic imaging, can occur. However, in the case of the multi-lens cameras of FIGS. 1 and 2, stereoscopic imaging is not a goal, and when the image streams from the two image sensors 14 and 16 are interlaced to create a motion sequence, significant angular difference could create perceptual discontinuity artifacts. The physical structure of the camera can help to reduce these effects. For example, if the physical offset or separation between the two optical axes is below the range (~53-70 mm) required for stereoscopic image capture, than the angular differences will tend to create visually imperceptible differences in the images. Additionally, human visual perception is less sensitive to vertically oriented angular errors than horizontally oriented ones. In this context then, the camera illustrated in FIG. 2A has a preferred geometry, in which the pair of 3 or 4 lenses are oriented vertically with an axial offset of ~25 mm. However, small differences in image capture, based on the geometry of image capture, may still yield image differences, particularly when imaging near objects with abrupt structural surfaces. The image processor 50 can have additional functions, beyond the sensor data registration block 113, to correct these residual image differences when interleaved motion sequences are being created from the multi-lens camera.

It is noted that the registration correction step provided by sensor data registration block 113 is not necessary in the case that the image sensors share one common lens, as in FIG. 3. In that case, the image data from the two image sensors is spatially aligned without any correction.

In another embodiment, the data from the second image sensor is also adjusted to match the image quality of the data from the first image sensor. This correction accounts for other variations in the capture modules, such as noise or spectral characteristics, which might generate noticeable artifacts when data from the two image sensors are interleaved.

Figure 5B:
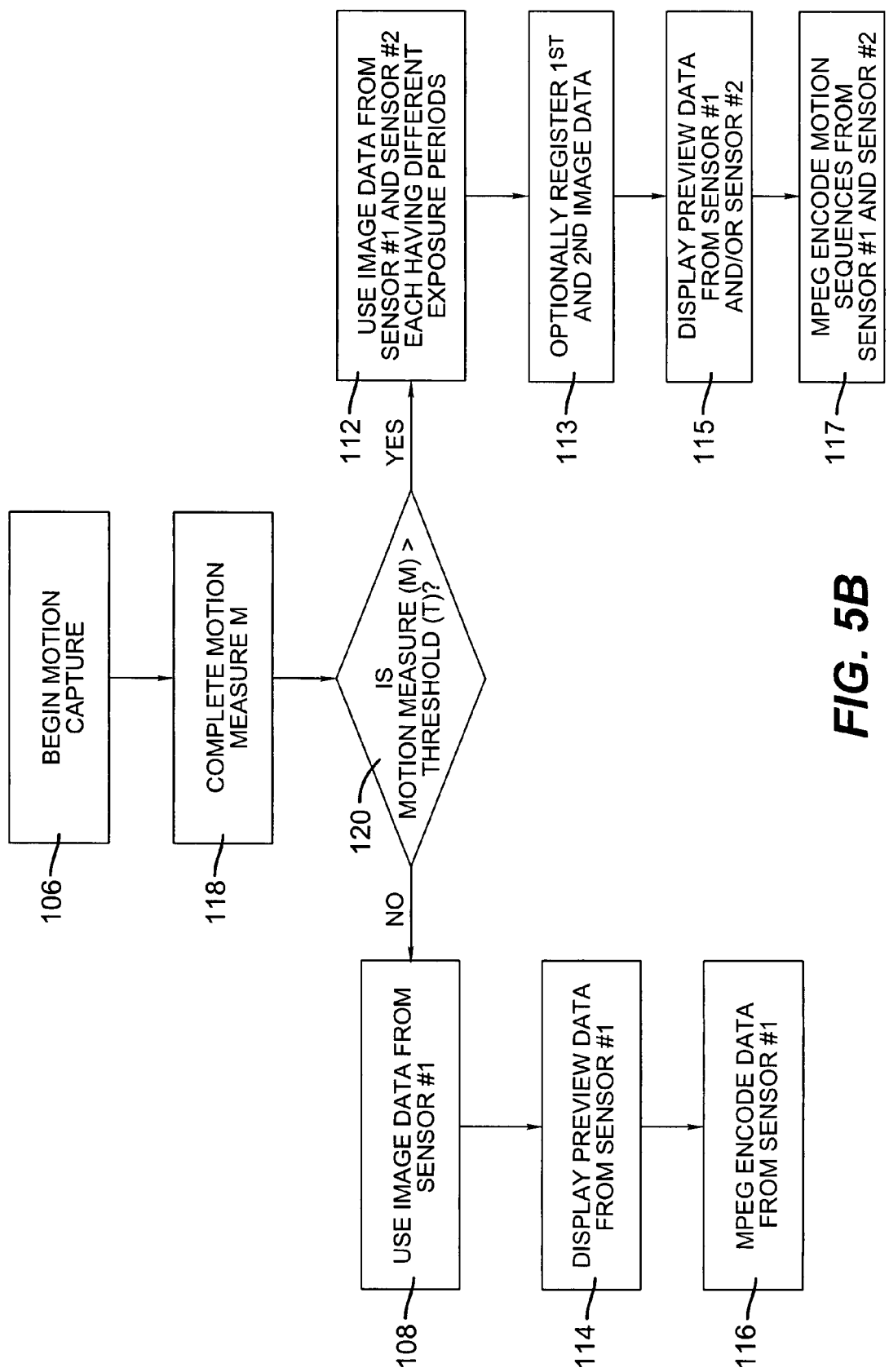

FIG. 5B depicts a flow diagram to automatically detect the presence of significant motion in the scene and automatically enable the "stop action" mode similar to as FIG. 5A. In FIG. 5B, additional functionality in the image processor 50 allows automatic detection of the presence of significant motion in the scene and automatically enable the "stop action" mode. In particular, beginning with the second frame of the motion sequence, for example, in block 118 a motion measure is calculated that represents the motion between the current and previous frames. Such motion measures include global motion estimates, block-based motion estimates, displaced frame difference energy, and the like. If the motion measure (M) does not exceed a threshold (T) ("no" to block 120), data from the first sensor 14 is selected in block 108, and the "stop action" mode is not enabled. Blocks 114 and 116 are the same as described earlier in reference to FIG. 5A. If the motion measure is greater than the threshold (T) ("yes" to block 120), data from both the first sensor 14 and the second sensor 16 is captured in block 112 using different exposure periods, and the "stop action" mode is enabled. Blocks 113, 115, and 117 are the same as described earlier in reference to FIG. 5A.

Figure 5C:
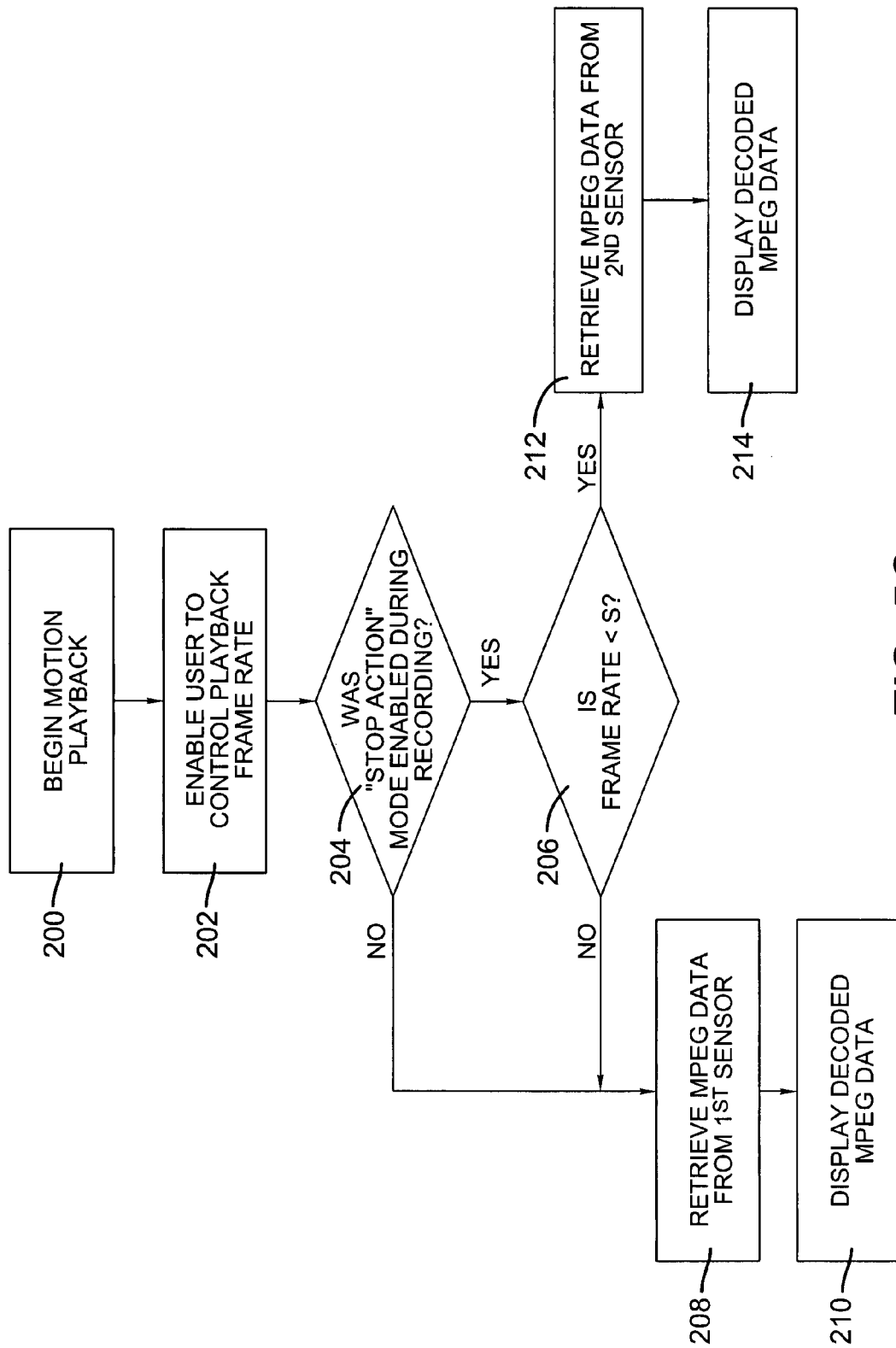
FIG. 5C depicts a flow diagram showing methods for playing back image sequences captured using the methods of FIG. 5A-B.

FIG. 5C depicts a flow diagram showing techniques for playing back image sequences captured using the methods of FIGS. 5A-B. In block 200, the motion playback mode is enabled. This can be done using the camera 10A, or using a separate playback device (not shown), which could be, for example, a dedicated video player or a general purpose computer. The separate playback device can include software used to playback the image sequences captured. If the playback device does not have the software resident in memory, a manual or automatic link can be provided to download the software into the memory of the playback device.

In block 202, the user is provided with a control that enables the playback frame rate to be adjusted from a normal rate of N frames per second, to a slower frame rate. The slower frame rate can be, for example, a super-slow motion frame rate of 1 to 5 frames per second, and can include a "freeze" frame mode which displays one of the motion image frames as a still image.

In block 204, the recorded file is checked to see if the "stop action" mode was enabled during recording, for example by checking whether metadata in the recorded file indicates that the "stop action" mode was used. If the stop action mode was enabled ("yes" to block 204), in block 206 the current playback frame rate is checked to determine if it is less than a threshold S, which may be, for example, N/6. If it is not less than the threshold S ("no" to block 206), or if the stop action mode was not enabled during recording ("no" to block 204), then in block 208 the MPEG compressed image data from the first sensor is retrieved. In block 210, the MPEG data from the first sensor is decompressed and displayed. Since the exposure time of the first image sensor is relatively long (e.g. 1/30 second), the displayed image will show smooth motion and will not be significantly affected by temporal aliasing artifacts.

If the frame rate is less than S ("yes" to block 206), then in block 212 the MPEG data from the second sensor is retrieved. In block 214 the MPEG data from the second sensor is decompressed and displayed. Since the exposure time of the second image sensor (e.g. 1/120 second) is significantly less than the exposure time of the first image sensor, the display will show a sharp image that has not been degraded by significant motion blur.

Figure 6A:
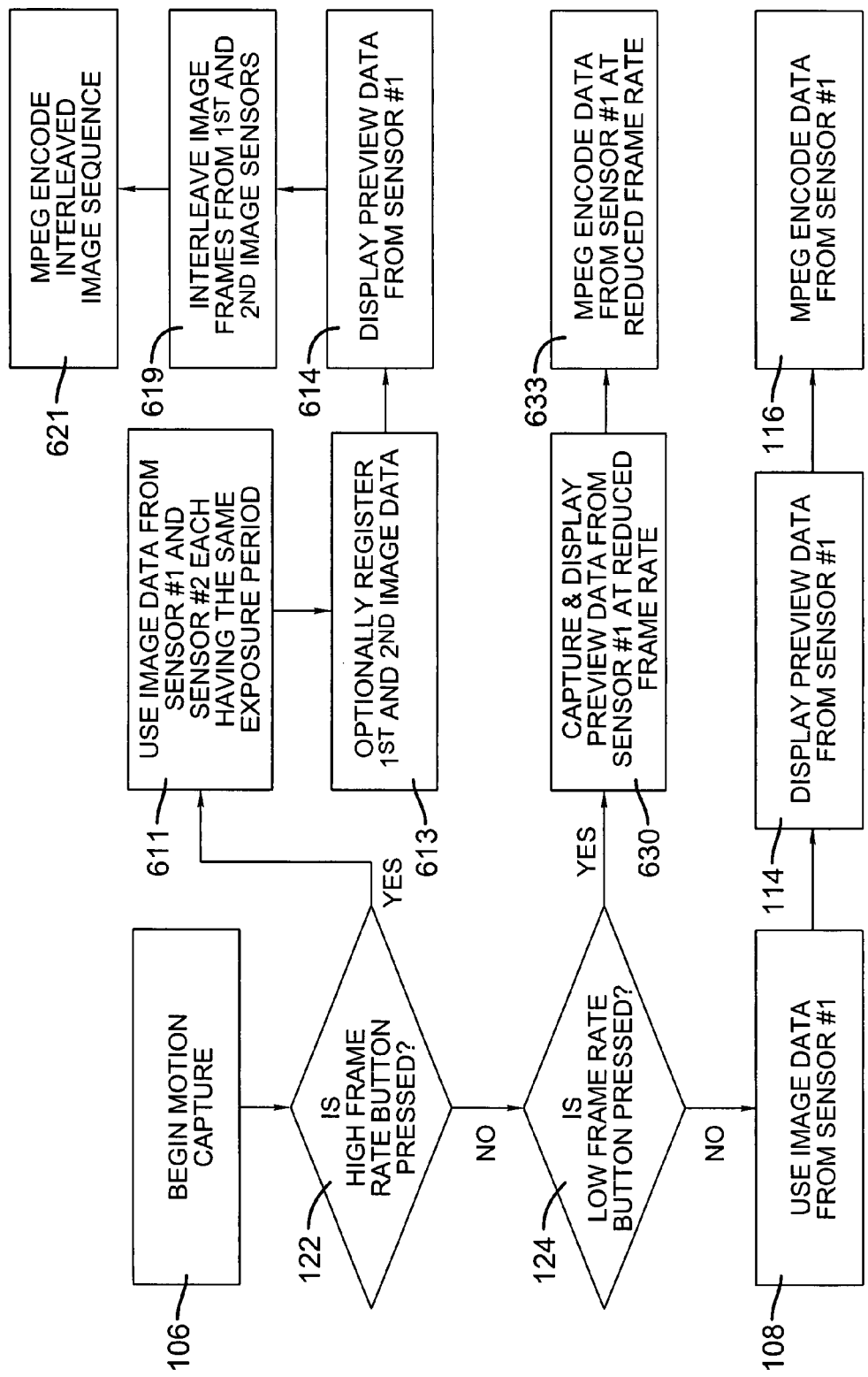
FIGS. 6A-B depict flow diagrams showing methods for capturing digital image sequences with high frame rate and low frame rate capabilities using the digital camera shown in FIG. 1 or FIG. 3 and the timing diagrams shown in FIGS. 4B-C.
Figure 6B:
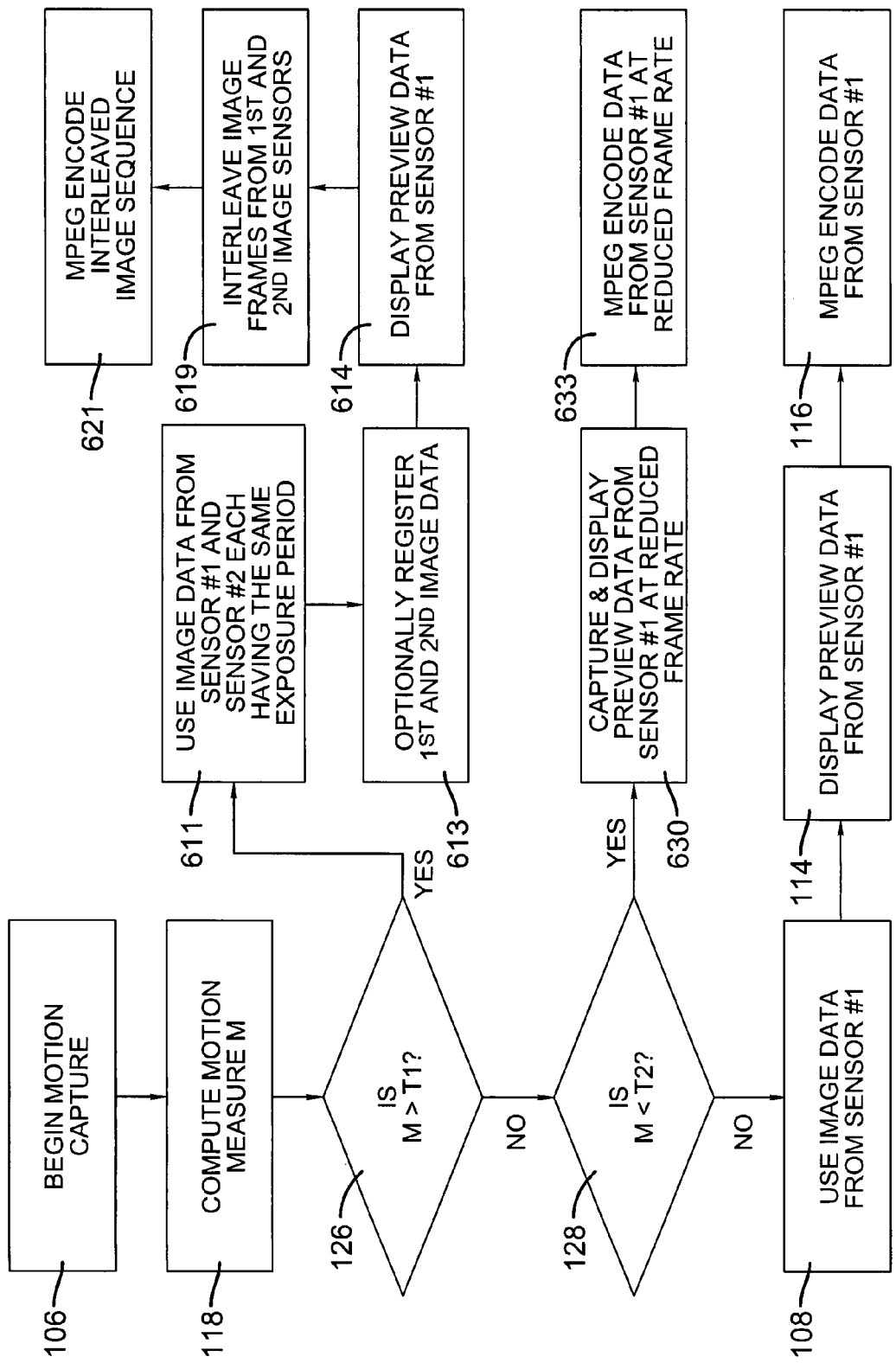

FIGS. 6A-B depict flow diagrams showing additional methods for capturing digital image sequences using the digital camera shown in FIG. 1 or FIG. 3, and corresponding to the timing diagrams shown in FIGS. 4B-C. In FIG. 6A, when a motion capture is initiated 106, the user has the option to depress a control button to initiate a high frame rate mode in block 122 or a different control button to initiate a low frame rate mode in block 124. These control buttons may be dedicated physical buttons on the camera. Alternatively, the controls may be co-located on an existing camera user interface control that is not normally used during motion capture. For example, the multi-position selector 42b can be pressed in one direction (e.g. the up direction) to initiate the high frame rate mode, and in a second direction (e.g. the down direction) to initiate the low frame rate mode.

If the high frame rate option is selected ("yes" to block 122), in block 611 images are captured using both the first image sensor 14 and the second image sensor 16, using the same exposure duration but offset by one-half the frame time of each sensor, as shown in FIG. 4B or FIG. 4C. However, the embodiment is not limited to the above mentioned offset, and any suitable offset can be used. In block 613, data from the first image sensor 14 and the second image sensor 16 is optionally registered by image processor 50, as described earlier in block 113 of FIG. 5A. In block 614, the image processor 50 selects image data from the first sensor for display at the normal display rate (e.g. 30 frames per second). In block 619, the image frames from the first image sensor 14 and the second image sensor 16 are temporally interleaved by the image processor 50 according to their exposure periods (as illustrated in FIG. 4B or FIG. 4C). The interleaving produces a single motion sequence having double the number of frames per second (e.g. 60 frames per second) as compared to the sequences provided by each of the sensors separately. In block 621, the interleaved image sequence is MPEG compressed by the image processor 50, and the MPEG compressed file is recorded on the removable memory card 54. The interleaved sequence recorded on the removable memory card 54 provides a high frame rate (e.g. 60 frames per second if each of the sensors operates at 30 frames per second). If the high recording frame rate (e.g. 60 frames per second) sequence is played back at the normal playback frame rate (e.g. 30 frames per second), the result is a slower motion sequence with smooth motion.

When the low frame rate mode is selected in block 124 ("yes" to block 124), in block 630 the camera selects image data from the first image sensor at a reduced temporal rate, for example by discarding alternate frames. The selected frames are MPEG encoded in block 633. Finally, in the case that neither the high frame rate nor the low frame rate mode is selected ("no" to block 124), the camera captures images using only the first image sensor, displays preview data from the first image sensor, and MPEG encodes the data from the first image sensor, in blocks 108, 114 and 116 respectively, as described earlier in reference to FIG. 5A.

Thus, the embodiment in FIG. 6A provides a digital motion camera that advantageously allows a user to toggle between high frame rate, normal frame rate, and low frame rate capture modes. This feature can also be extended to even higher frame rates through the use of more than two sensors. For example, if M (e.g. 4) sensors are used, a frame rate of N (e.g. 120) frames per second can be obtained by reading each sensor at a frame rate of N/M (e.g. 30) images per second, with each of the M sensors having a starting exposure time set to be K/N for integer values of K between 0 and N−1. This means that the sensor exposure periods will have a difference in starting times equal to an integer multiple of 1/N.

This high frame rate feature could potentially be implemented in a camera with a single lens and sensor, however, it would require a higher implementation cost as the image sensor, ASP A/D, and DRAM, would need to operate at higher speeds.

FIG. 6B depicts a similar flow diagram as FIG. 6A, with the addition of extra functionality to automatically detect the presence of motion in the scene and switch between the high frame rate, normal frame rate, and low frame rate modes. As in FIG. 5B, beginning with the second frame of the motion sequence, in block 118 a motion measure (M) is calculated that represents the motion between the current and previous frames. If the motion measure exceeds a first threshold T1 in block 126, the high frame rate mode is automatically enabled ("yes" to block 126) and blocks 611, 613, 614, 619, and 621 are performed as described earlier in reference to FIG. 6A. If the motion measure is smaller than a second threshold T2 in block 128, the low frame rate mode is automatically enabled ("yes" to block 128), and blocks 630 and 633 are performed, as described earlier in reference to FIG. 6A. If the motion measure is not smaller than a second threshold T2 in block 128 ("no" to block 128) the normal operation mode is enabled, and blocks 108, 114 and 116 are performed, as described earlier in reference to FIG. 5A. Thus, the user is not required to select the frame rate, and is freed to focus more completely on the motion capture experience.

In another embodiment of the present invention, the two image sensors are used as depicted in FIG. 4C during the normal camera operation, in order to provide an exposure time that is longer than the frame time. This can be done to reduce noise or to ensure that there are no temporal aliasing artifacts. For example, a frame rate of 30 images per second and an exposure time of 1/15 second can be provided by operating the two image sensors at a frame rate of 15 frames per second, with a temporal sampling offset of 1/30 second (i.e. a difference of 1/30 second between the beginning of the exposure periods of the two image sensors).

Figure 7:
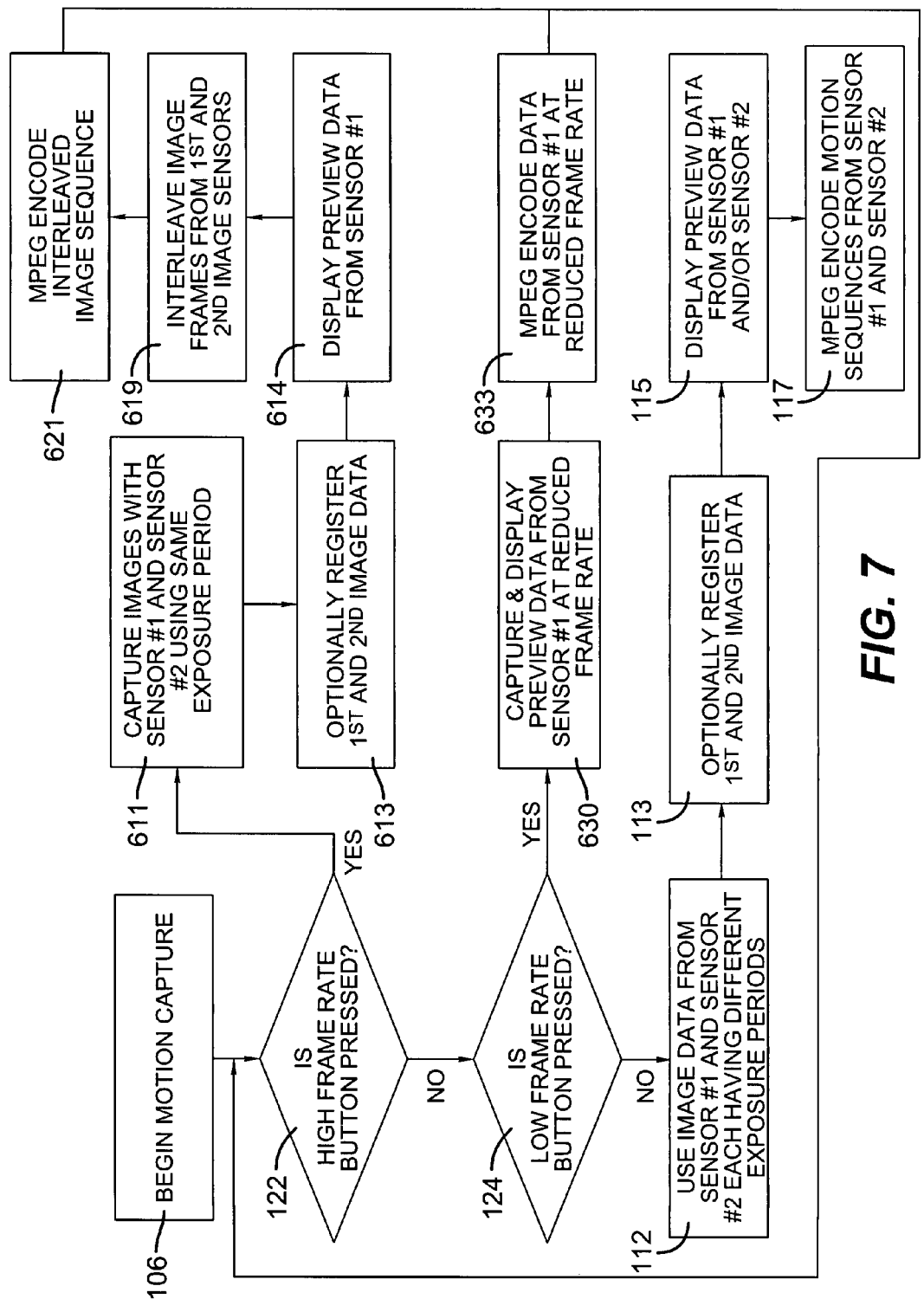
FIG. 7 depicts a flow diagram showing another method for capturing digital image sequences with high frame rate and low frame rate capabilities using the digital camera shown in FIG. 1 or FIG. 3 and the timing diagram shown in FIG. 4D.

FIG. 7 depicts a flow diagram showing an additional method for capturing digital image sequences using the digital camera shown in FIG. 1 or FIG. 3, and corresponding to the timing diagram shown in FIG. 4D. In FIG. 7, similar to FIG. 6A, when a motion capture is initiated in block 106, the user has the option to depress a high frame rate button in block 122 or a low frame rate button in block 124. If neither button is depressed ("no" to block 124), then two image sequences are recorded, using two different exposure times, as described earlier in reference to FIG. 4A.

When the high frame rate mode is selected ("yes" to block 122), the exposure duration of the first sensor is adjusted to match the exposure duration of the second sensor and images are captured from both the first and second image sensors in block 611, the images from the first and second image sensors are optionally registered in block 613, the preview data from the first sensor is displayed in block 614, the image frames are interleaved in block 619 and the interleaved sequence is MPEG encoded in block 621, as described earlier in reference to FIG. 6A. As the motion sequence is being recorded, the user has the option of changing the mode to a different mode (e.g. the low frame rate mode or the normal mode).

When the low frame rate mode is selected ("yes" to block 124), image data is previewed and MPEG encoded at a reduced frame rate, in blocks 630 and 633 respectively, as described earlier in reference to FIG. 6A. When neither the high frame rate mode nor the low frame rate mode is selected ("no" to block 124), the image data from both the first and second image sensors is captured using different exposure periods in block 112, optionally registered in block 113, displayed as preview data in block 115, and MPEG encoded in block 117, as described earlier in reference to FIG. 5A.

This motion capture embodiment advantageously allows a user to toggle between high frame rate, normal, and low frame rate captures. It also possesses the additional advantage that in the final MPEG motion sequence, frames corresponding to the normal mode are captured using both relatively long and relatively short exposure periods, so that they can be viewed at normal speed without temporal aliasing artifacts, and at slow speed without significant motion blur, as was described earlier in relation to FIG. 5C. Note that the timing diagram of FIG. 4D corresponds to the situation where the camera begins in the normal mode ("no" to block 124) and then switches, when the high frame rate mode is activated ("yes" to block 122) to the high frame rate mode. Note that this technique could also be extended to automatic mode detection as described earlier in FIG. 6B.

Figure 8A:
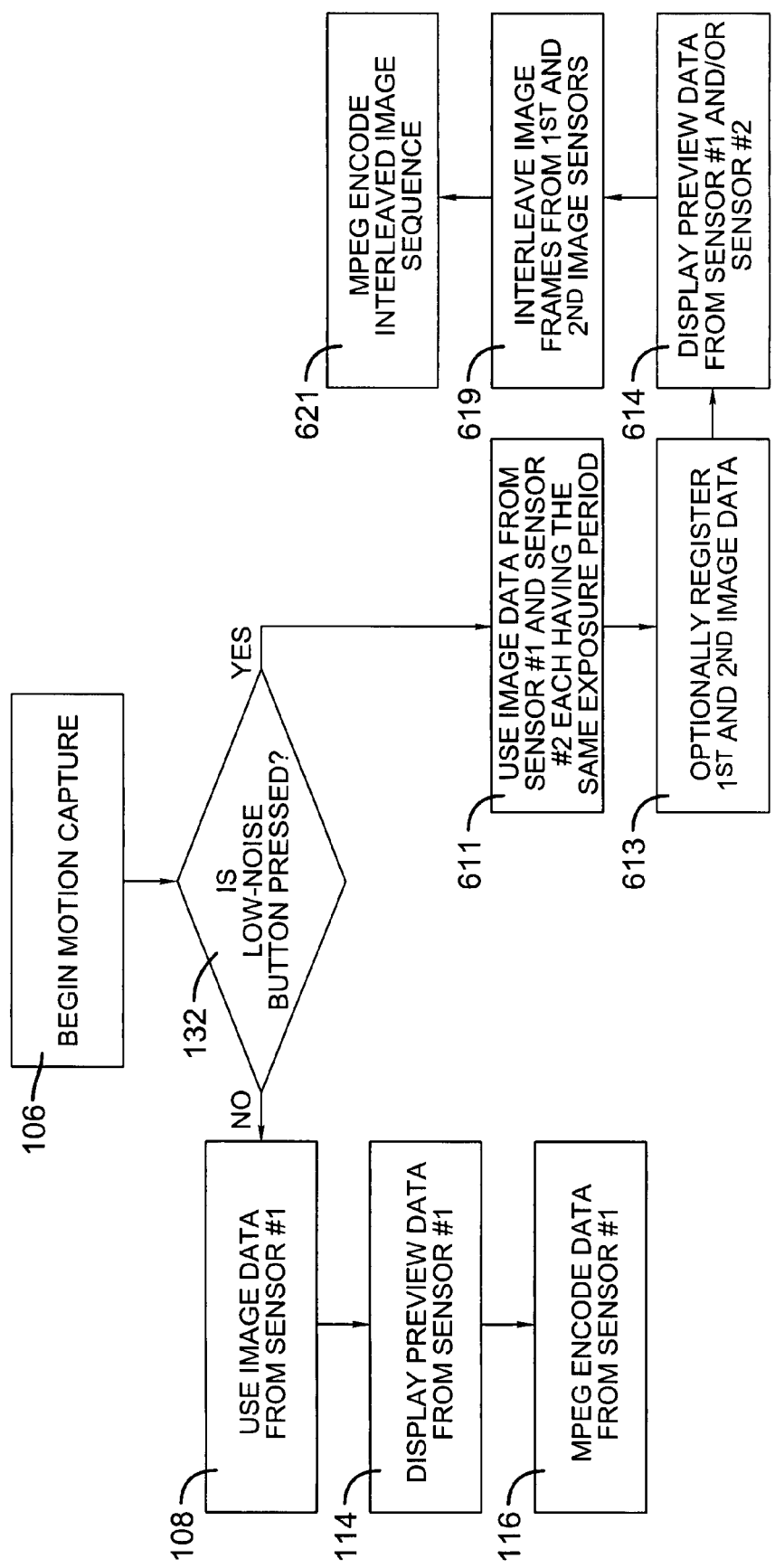
FIGS. 8A-B depict flow diagrams showing methods for capturing digital image sequences with improved signal-to-noise performance using the digital camera shown in FIG. 1 or FIG. 3 and the timing diagram shown in FIG. 4E.
Figure 8B:
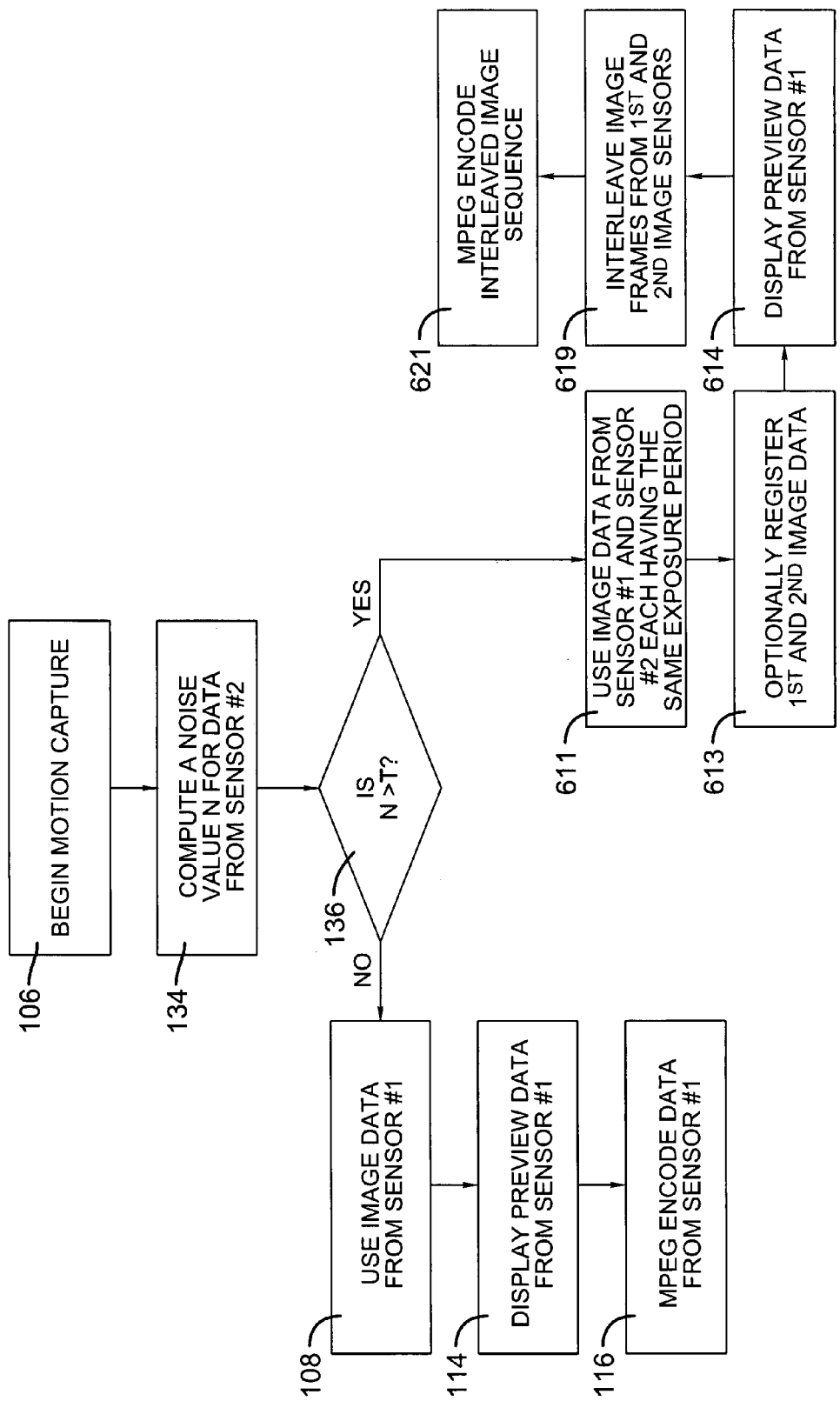

FIGS. 8A-B depict flow diagrams showing additional methods for capturing digital image sequences using the digital camera shown in FIG. 1 or FIG. 3, and corresponding to the timing diagram shown in FIG. 4E. In FIG. 8A, when a motion capture is initiated in block 106, the user has the option to press a low-noise button in block 132. The low-noise button may be a dedicated physical button on the camera. In one embodiment, however, the low-noise functionality is co-located on an existing camera feature that is not normally in use during motion capture. For example, the multi-position selector 42b can be pressed to initiate low-noise, or the shutter button 42a can be partially depressed to initiate low-noise. If the low-noise option is selected ("yes" to block 132), the camera uses image data from both image sensors using exposure durations that are extended to a duration that is longer than the frame time, and blocks 611, 613, 614, 619, and 621 are performed as described earlier in reference to FIG. 6A. When the low-noise option is not selected ("no" to block 132), the camera selects image data from only the first image sensor 108, and blocks 108, 114, and 116 are performed as described earlier in reference to FIG. 6A. In the example shown in FIG. 4E, the camera begins in the normal mode ("no" to block 132) and then is switched by the user to the low noise mode ("yes" to block 132). Note that the frame rate of the first image sensor in the low noise mode is one-half of the frame rate in the normal mode. This provides additional exposure to the image sensor under low light conditions. This motion capture mode advantageously allows a user to toggle between longer and shorter frame exposure periods during the motion capture. To capture a motion sequence with smoother motion and less noise, the longer exposure duration is provided using both image sensors. Otherwise, the shorter exposure duration provided by the normal mode is used to offer better stop-action performance.

FIG. 8B depicts a similar flow diagram as FIG. 8A, with the addition of extra functionality to automatically compute a noise value for the data from the second image sensor in block 134. If the noise value N is not greater than a threshold (T) in block 136, ("no" to block 136), data from the only the first sensor is chosen, and blocks 108, 114, and 116 are performed as described earlier in reference to FIG. 6A. If the noise value N is greater than the threshold (T), ("yes" to block 136), the camera uses image data from both image sensors using exposure times that are longer than the frame time, and blocks 611, 613, 614, 619, and 621 are performed as described earlier in reference to FIG. 6A. In this embodiment, the user is not required to select the low-noise feature, and is freed to focus more completely on the motion capture experience.

Figure 9:
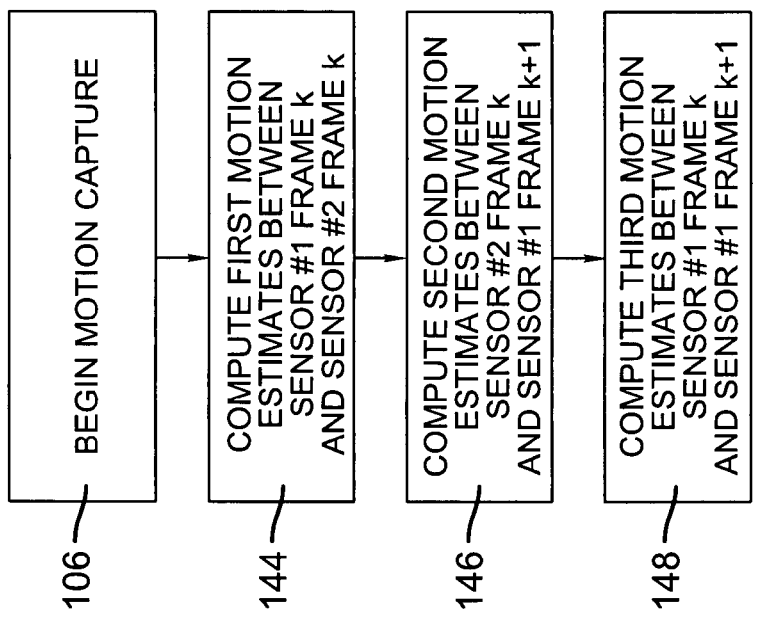
FIG. 9 depicts a flow diagram showing a method for computing improved motion vector information using the digital camera shown in FIG. 1 or FIG. 3 and the timing diagram shown in FIGS. 4B-C.

FIG. 9 depicts a flow diagram showing a method for computing motion vector information using the digital camera shown in FIG. 1 or FIG. 3, wherein the first sensor is used to provide the image sequence to be recorded, and the second image sensor is used to provide additional motion frames used to assist in determining the final motion vectors used to compress the motion sequence from the first image sensor. In FIG. 9, when a motion capture is initiated in block 106, the data from only the first sensor is used for display and MPEG encoding. When encoding frame k+1 of image data from the first sensor, normally frame k from the first sensor is used as a reference for computing motion estimates.

In the instant invention, frame k of image data from the second sensor is used to improve the motion estimation process. In particular, in block 144, a first set of motion estimates is derived that relate frame k image data from the first image sensor with frame k image data from the second sensor. Next, in block 146 a second set of motion estimates is derived that relate frame k image data from the second image sensor to frame k+1 image data from the first image sensor. Finally, in block 148 the motion estimates derived in the previous two steps are used in the derivation of the motion vector estimates that relate frame k image data from the first image sensor with frame k+1 image data from the first image sensor.

This motion capture mode advantageously generates intermediate motion vectors to assist in the derivation of final motion vectors used in the MPEG encoding process. The frame k data used from the second sensor represents the temporal midpoint between the consecutive frames k and k+1 from the first sensor. Extra motion information between the first sensor frame k data and the second sensor frame k data corresponds to only half the time interval covered between frame k and frame k+1 from the first sensor. Similarly, the motion information between the second sensor frame k data and the first sensor frame k+1 data corresponds to half the time interval covered between frame k and frame k+1 from the first sensor. These intermediate motion estimates can assist in the determination of more accurate motion vectors between frames k and k+1 of the first image sensor than is possible without intermediate motion information. Improved motion vector accuracy is useful for downstream tasks such as object segmentation and motion stabilization. Improved motion vector accuracy can also results in more effective compression of the motion vector information in the MPEG bitstream.

Figure 10:
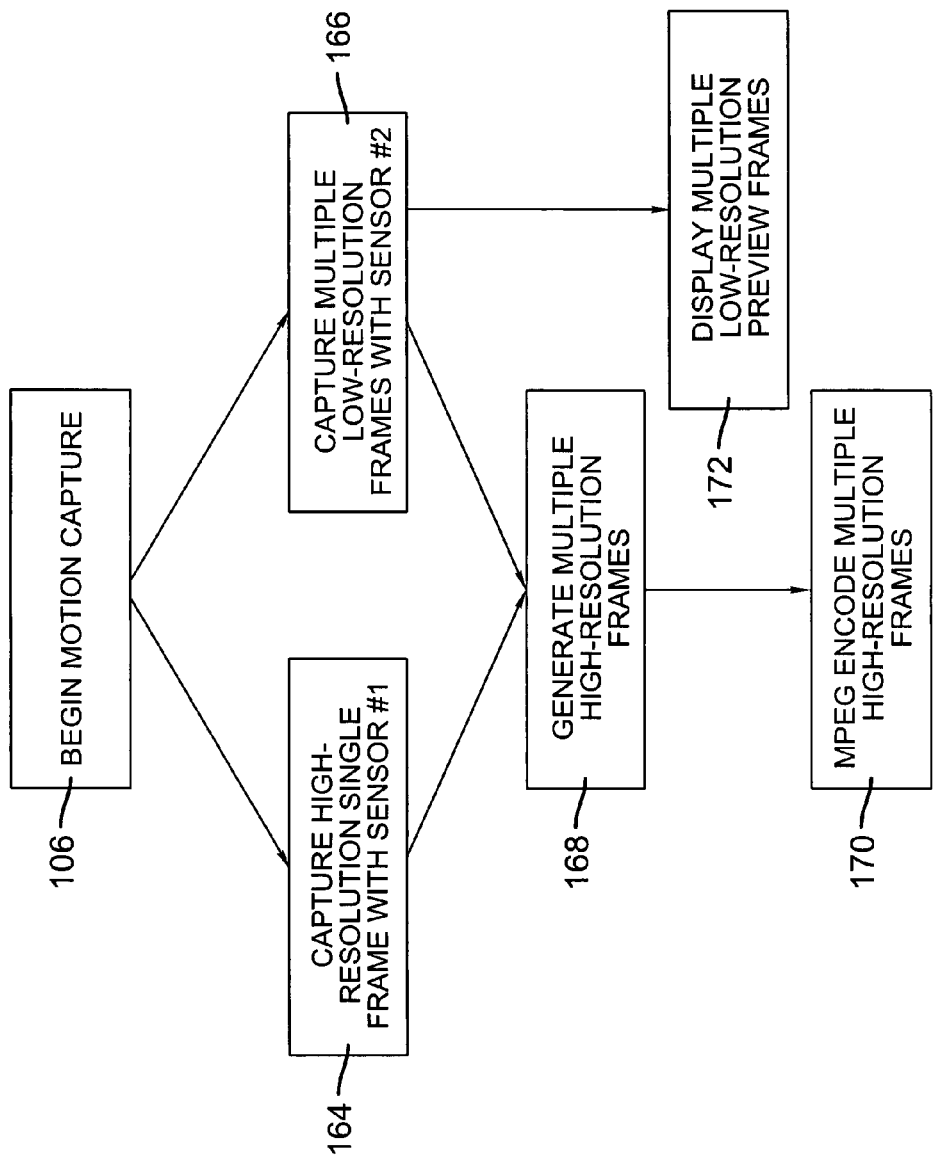
FIG. 10 depicts a flow diagram showing a method for capturing digital image sequences with high spatial resolution and high frame rate using the digital camera shown in FIG. 1 or FIG. 3 and the timing diagram shown in FIGS. 4F.

FIG. 10 depicts a flow diagram showing an additional method for capturing digital image sequences using the digital camera shown in FIG. 1 or FIG. 3, and corresponding to the timing diagram shown in FIG. 4F. In FIG. 10, when a motion capture is initiated in block 106, data from a first image sensor is captured at a low frame rate, high spatial resolution and longer exposure time duration 164. In block 166, data from a second image sensor is substantially simultaneously captured at a high frame rate, low spatial resolution and shorter exposure time duration. In block 168, the data from both image sensors is registered and combined or interleaved to generate a single motion sequence with the high frame rate associated with the second image sensor, and the high spatial resolution associated with the first image sensor. In block 170, this high-resolution, high frame rate data is MPEG encoded. In block 172, the low-resolution, high frame rate data from the second image sensor is displayed as preview frames on the color LCD image display 70.

This motion capture mode has the advantage that it allows the creation of a high-resolution, high frame rate motion sequence, without requiring that either individual sensor be capable of capturing and reading out data at high spatial-resolution and high frame rate. While this effect could be achieved with a single sensor with high spatial resolution and high frame rate capabilities, such a sensor would incur greater cost in the camera to be able to read the increased amount of data off of the sensor quickly enough to allow real-time motion processing at the desired frame rate and spatial resolution.

Motion image sequences captured with a dual lens/sensor system provide many advantages relative to a single lens/sensor camera. Capture constraints, such as sensor read-out time and required frame exposure time, can be shared between the multiple lenses and sensors. Overlapped exposure periods allow for the integration of more light than is possible with a single equivalent lens and sensor, leading to motion sequences with reduced noise. Staggered frame capture between the two sensors also allows for easy implementation of features such as higher frame rate capture. A similar feature implemented with a single sensor would require an increase in the capture frame rate capabilities, and would also have greater restrictions on frame integration period, resulting in noisier sequences.

Interleaving the data from two sensors into one MPEG codestream requires that the MPEG encoder can process the increased data in real-time. Alternatively, the MPEG encoding burden can be shared among multiple encoders. This can be accomplished through parallel processing at the frame level, by using only 'I' frames, such that there is no temporal coding dependency between frames. It can also be accomplished at the frame level by using open-loop motion estimation, in which motion estimates are derived from original frame data as opposed to previously coded frame data. Open-loop motion estimation removes the requirement that a frame be encoded completely before it can be used as a motion reference frame. Parallel processing can also be implemented at the macro-block level, as tasks such as motion estimation can be made independent for separate macro-blocks.

Alternate embodiments can use different numbers of sensors. Clearly, other lens focal lengths and lens type constructions are within the scope of the invention.

The invention has been described in detail with particular reference to certain embodiments thereof, but it will be understood that variations and modifications can be effected without following the example embodiments and applications illustrated and described herein, and without departing from the true spirit and scope of the invention, which is set forth in the following claims.

PARTS LIST 1 front optical profile of the camera
3 first zoom lens 4 second zoom lens
5a zoom and focus motors
5b zoom and focus motors
5c single zoom lens
7 beam splitter
10A digital camera (first embodiment)
13 clock drivers
14 first image sensor
14e analog output signal
15 clock drivers
16 second image sensor
16e analog output signal
22 first analog signal processor (ASP1)
24 second analog signal processor (ASP2)
36 first DRAM buffer memory
38 second DRAM buffer memory
40 control processor and timing generator
42 user controls
42a shutter button
42b multiposition selector
42c zoom button
48 electronic flash
50 image processor
52 memory card interface
54 removable memory card
56 RAM memory
58 firmware memory
62 host interface
64 interconnection
66 host PC
70 color LCD image display
90 cellular processor
92 cellular modem
94 antenna
100A sensor #1 exposure interval
100B sensor #1 exposure interval
100C sensor #1 exposure interval
100D sensor #1 exposure interval
100E sensor #1 exposure interval
100F sensor #1 exposure interval
100X sensor #1 exposure interval
100Z sensor #1 exposure interval
102A sensor #2 exposure interval
102B sensor #2 exposure interval
102C sensor #2 exposure interval
102D sensor #2 exposure interval
102E sensor #2 exposure interval
102F sensor #2 exposure interval
102X sensor #2 exposure interval
102Z sensor #2 exposure interval
103 exposure time
105 sensor #1 exposure interval
106 motion capture initiation block
108 first sensor capture block
109 sensor data registration block
110 stop action decision block
111 same exposure first and second sensor capture block
112 different exposure first and second sensor capture block
113 sensor data registration block
114 preview data display block
115 preview data display block
116 first sensor MPEG encoding block
117 first and second sensor MPEG encoding block
118 motion measure computation block
119 sequence interleave block
120 motion threshold decision block
121 MPEG encode interleaved sequence block
122 high frame rate decision block
123 reduced frame rate MPEG encode block
124 low frame rate decision block
126 initial motion threshold decision block
127 display preview data
128 second motion threshold decision block
132 low noise decision block
134 signal-to-noise computation block
136 signal-to-noise threshold decision block
144 first motion estimate calculation block
146 second motion estimate calculation block
148 third motion estimate calculation block
164 single high resolution frame capture block
166 multiple low resolution frame capture block
168 multiple high resolution frame generation block
170 high resolution MPEG encode block
172 low resolution preview frames
200 motion playback mode
202 user playback frame rate control
204 stop action decision block
206 frame rate threshold decision block
208 first sensor MPEG data retrieval block
210 decoded MPEG data display block
212 second sensor MPEG data retrieval block
214 decoded MPEG data display block
611 block
613 block
614 block
619 block
621 block
630 block
633 block

The invention claimed is:

1. An electronic camera comprising: a frame rate control for selecting high and normal frame rate options; a first image sensor for generating a first sensor output wherein when the normal frame rate option is selected the first sensor output comprises a first sequence of motion image frames for providing smooth rendition at normal playback speeds; a second image sensor for generating a second sensor output wherein when the normal frame rate option is selected the second sensor output comprises a second sequence of motion image frames for providing sharper images at slow playback speeds; one or more lenses for forming images of a scene on the first and second image sensors; a timing generator for controlling the exposure period of the first image sensor and the exposure period of the second image sensor, wherein the exposure period of the first image sensor is longer than the exposure period of the second image sensor when the normal frame rate option is selected and the exposure period of the first image sensor is adjusted to match the exposure period of the second image sensor when high frame rate is selected; and a digital memory for storing the first and second sensor outputs wherein when the high frame rate option is selected, a single sequence of motion image frames is formed by interleaving the frames of the first and second sensor outputs, and wherein when the normal frame rate option is selected, two separate sequences of motion image frames are recorded substantially simultaneously in the digital memory and the two separate sequences include a first sequence which provides smooth motion rendition at normal playback speeds and a second sequence which provides sharper images at slow playback speeds.

2. The electronic camera of claim 1, wherein when the normal frame rate option is selected, the first image sensor captures an image sequence of the scene at a frame rate of N frames per second.

3. The electronic camera of claim 1, wherein when the normal frame rate option is selected, the second image sensor captures an image sequence of the scene at a frame rate of N frames per second and the second image sensor output provides an exposure period that is less than 1/N seconds.

4. The electronic camera of claim 1 further comprising an image processor for automatically determining whether the first sensor output and the second sensor output is included in the image sequence based on an analysis of a noise level in the scene.

5. The electronic camera of claim 1, wherein the second sensor output is registered with the first sensor output.

* * * * *